(12) United States Patent
Lawler et al.

(10) Patent No.: US 12,445,029 B2
(45) Date of Patent: Oct. 14, 2025

(54) LINEAR ELECTROMAGNETIC MACHINE WITH A STATOR HAVING STATOR TEETH ARRANGED TO PROVIDE AN ANTI-CLOCKING FORCE

(71) Applicant: MAINSPRING ENERGY, INC., Menlo Park, CA (US)

(72) Inventors: John Lawler, Portland, OR (US); John Powers, Menlo Park, CA (US); Scott Coakley, Belmont, CA (US); Alan Crapo, San Jose, CA (US); David DeGraaff, Mountain View, CA (US); Christopher David Gadda, Palo Alto, CA (US); Andrew Hancock, Fremont, CA (US); Shannon Miller, Belmont, CA (US); Samuel Sherman, San Francisco, CA (US); Matthew Svrcek, Redwood City, CA (US); Kevin Walters, Redwood City, CA (US)

(73) Assignee: Mainspring Energy, Inc., Menlo Park, CA (US)

( * ) Notice: Subject to any disclaimer, the term of this patent is extended or adjusted under 35 U.S.C. 154(b) by 0 days.

(21) Appl. No.: 18/112,634

(22) Filed: Feb. 22, 2023

(65) Prior Publication Data
US 2023/0198367 A1    Jun. 22, 2023

Related U.S. Application Data

(63) Continuation of application No. 17/226,582, filed on Apr. 9, 2021, now Pat. No. 11,616,428, which is a
(Continued)

(51) Int. Cl.
*H02K 7/08*    (2006.01)
*F02B 71/04*   (2006.01)
(Continued)

(52) U.S. Cl.
CPC ............. *H02K 33/18* (2013.01); *F02B 71/04* (2013.01); *F16C 32/0603* (2013.01); *H02K 7/08* (2013.01); *H02K 7/1884* (2013.01)

(58) Field of Classification Search
CPC .......... H02K 33/00; H02K 33/18; H02K 7/08; H02K 7/1884; H02K 7/1876; H02K 41/033; F02B 71/04; F16C 32/0603
(Continued)

(56) References Cited

U.S. PATENT DOCUMENTS

| | | | | | |
|---|---|---|---|---|---|
| 3,777,722 | A | * | 12/1973 | Lenger | .................... F04B 31/00 |
| | | | | | 123/193.2 |
| 4,099,106 | A | * | 7/1978 | Nikaido | .................... B41J 29/38 |
| | | | | | 318/135 |

(Continued)

FOREIGN PATENT DOCUMENTS

| CN | 101951114 A | 1/2011 |
|---|---|---|
| CN | 105811732 A | 7/2016 |

(Continued)

OTHER PUBLICATIONS

U.S. Appl. No. 18/077,007, filed Dec. 7, 2022, Adam Simpson.
(Continued)

*Primary Examiner* — Maged M Almawri
(74) *Attorney, Agent, or Firm* — Haley Guiliano LLP

(57) ABSTRACT

A linear electromagnetic machine includes a stator, a translator, and a bearing system. The bearing system maintains alignment against lateral displacement of the translator relative to the stator, as the translator reciprocates axially. More particularly, the bearing system maintains a motor air gap between the stator and a magnetic section of the translator. The stator includes a plurality of stator teeth and windings, which form a plurality of phases. The stator teeth and windings are arranged using a hoop stack with spines to
(Continued)

form a stator bore and define the motor air gap. The bearing system can include bearing housings that are configured to form a bearing interface with a surface of the translator. The bearing interface can include a contact bearing or a non-contact bearing, such as a gas bearing. Current is controlled in the phases to convert between electrical energy and kinetic energy of the translator.

21 Claims, 19 Drawing Sheets

Related U.S. Application Data continuation of application No. 16/521,541, filed on Jul. 24, 2019, now Pat. No. 10,985,641.

(60) Provisional application No. 62/703,338, filed on Jul. 25, 2018, provisional application No. 62/702,860, filed on Jul. 24, 2018.

(51) Int. Cl.
*F16C 32/06* (2006.01)
*H02K 7/18* (2006.01)
*H02K 33/18* (2006.01)

(58) Field of Classification Search
USPC .................... 310/15–25, 12.01–12.31
See application file for complete search history.

(56) References Cited

U.S. PATENT DOCUMENTS

| | | | | |
|---|---|---|---|---|
| 4,455,974 A * | 6/1984 | Shapiro | F16C 32/0685 | 123/47 R |
| 4,563,602 A * | 1/1986 | Nagasaka | H02K 41/03 | 310/12.21 |
| 4,837,467 A * | 6/1989 | Newman | H02K 41/033 | 318/135 |
| 5,108,072 A * | 4/1992 | Kragten | G05D 16/2013 | 251/129.08 |
| 5,315,751 A * | 5/1994 | Hammer | H02K 41/033 | 29/598 |
| 5,627,418 A * | 5/1997 | Satomi | H02K 41/031 | 310/191 |
| 5,654,596 A * | 8/1997 | Nasar | H02K 35/06 | 310/12.21 |
| 6,199,519 B1 * | 3/2001 | Van Blarigan | F02B 75/04 | 123/46 R |
| 6,313,552 B1 | 11/2001 | Boast | | |
| 6,378,875 B1 * | 4/2002 | Feistel | F16J 15/26 | 277/435 |
| 6,428,210 B1 * | 8/2002 | Kafai | F16C 29/025 | 384/12 |
| 6,703,726 B2 * | 3/2004 | Itoh | H02K 41/033 | 310/12.02 |
| 7,311,036 B2 * | 12/2007 | Uchino | F15B 15/1447 | 92/DIG. 1 |
| 7,438,027 B1 * | 10/2008 | Hinderks | F02B 75/32 | 123/197.1 |
| 7,698,803 B2 * | 4/2010 | Mitsui | H02K 15/022 | 29/605 |
| 8,053,937 B2 * | 11/2011 | Nakano | G03F 7/70758 | 310/12.24 |
| 8,413,617 B2 | 4/2013 | Simpson et al. | | |
| 8,558,486 B2 * | 10/2013 | Smick | H02K 16/00 | 315/505 |
| 8,607,560 B2 | 12/2013 | Fiedler | | |
| 8,610,320 B2 * | 12/2013 | Kobayashi | F02B 63/04 | 310/34 |
| 8,688,345 B2 * | 4/2014 | Boughtwood | H02K 7/14 | 318/560 |
| 9,059,626 B2 * | 6/2015 | Sugita | H02K 33/16 | |
| 9,353,767 B2 * | 5/2016 | Richardson | F01D 25/246 | |
| 9,657,675 B1 * | 5/2017 | Roelle | F02D 41/009 | |
| 9,825,512 B2 * | 11/2017 | Shijo | H02K 15/022 | |
| 9,985,512 B2 * | 5/2018 | Powell | H02K 1/28 | |
| 10,243,441 B2 * | 3/2019 | Jacobs | H02K 41/031 | |
| 10,298,103 B2 * | 5/2019 | Urabe | H02K 15/024 | |
| 11,616,428 B2 | 3/2023 | Lawler et al. | | |
| 2002/0139323 A1 | 10/2002 | Kerrebrock | | |
| 2002/0145358 A1 * | 10/2002 | Godkin | H02K 3/493 | 310/91 |
| 2003/0024492 A1 * | 2/2003 | Malmquist | F02B 71/04 | 123/46 E |
| 2003/0111914 A1 * | 6/2003 | Miyagawa | H02K 3/522 | 310/12.26 |
| 2003/0230941 A1 * | 12/2003 | Jacobs | B65G 47/841 | 310/12.19 |
| 2004/0256919 A1 * | 12/2004 | Hashimoto | H02K 41/03 | 310/12.25 |
| 2005/0109295 A1 | 5/2005 | Kaneko et al. | | |
| 2005/0172800 A1 * | 8/2005 | Uchino | F16C 29/025 | 92/54 |
| 2005/0195381 A1 * | 9/2005 | Cuijpers | H02K 41/031 | 355/75 |
| 2008/0218005 A1 | 9/2008 | Tang et al. | | |
| 2009/0134626 A1 * | 5/2009 | Hoppe | H02K 21/24 | 290/55 |
| 2009/0302692 A1 * | 12/2009 | Tang | H02K 41/031 | 310/12.25 |
| 2010/0019589 A1 * | 1/2010 | Saban | H02K 5/1285 | 310/216.069 |
| 2010/0259112 A1 * | 10/2010 | Chung | H02K 16/00 | 310/12.18 |
| 2011/0175462 A1 | 7/2011 | Boletis et al. | | |
| 2011/0248579 A1 * | 10/2011 | Aoyama | H02K 41/031 | 310/12.25 |
| 2012/0001499 A1 | 1/2012 | Makino et al. | | |
| 2012/0125291 A1 * | 5/2012 | Simpson | F02B 75/282 | 123/46 E |
| 2012/0126543 A1 * | 5/2012 | Simpson | H02K 7/1884 | 290/1 A |
| 2012/0204836 A1 * | 8/2012 | Roelle | F02B 75/285 | 123/46 R |
| 2014/0193251 A1 * | 7/2014 | Richardson | F01D 25/246 | 29/889.22 |
| 2015/0295485 A1 | 10/2015 | Sutani et al. | | |
| 2018/0145575 A1 | 5/2018 | Woehl-Bruhn et al. | | |
| 2019/0103800 A1 * | 4/2019 | Ozimek | H02K 41/0358 | |
| 2020/0036273 A1 | 1/2020 | Lawler et al. | | |
| 2020/0124500 A1 * | 4/2020 | Haynes | G01M 7/022 | |
| 2022/0077737 A1 * | 3/2022 | Büttner | H02K 1/28 | |
| 2022/0247297 A1 * | 8/2022 | Shizu | H02K 41/033 | |
| 2023/0318426 A1 * | 10/2023 | Yokochi | H02K 41/033 | 310/12.18 |
| 2024/0413728 A1 * | 12/2024 | Wampler | F04C 15/008 | |

FOREIGN PATENT DOCUMENTS

| | | |
|---|---|---|
| CN | 110326199 A | 10/2019 |
| JP | 56-083259 A | 7/1981 |
| JP | 04-229063 A | 8/1992 |
| JP | 08-047204 A | 2/1996 |
| JP | 2008-104279 A | 5/2008 |
| JP | 2009-008068 A | 1/2009 |
| JP | 2009-038869 A | 2/2009 |
| WO | 01/45977 A2 | 6/2001 |
| WO | WO-2012048684 A2 * | 4/2012 ............ F04D 13/06 |

OTHER PUBLICATIONS

Mikalsen et al., "A Review of Free-Piston Engine History and Applications," Applied Thermal Engineering 27 (2007); pp. 2339-2352.

* cited by examiner

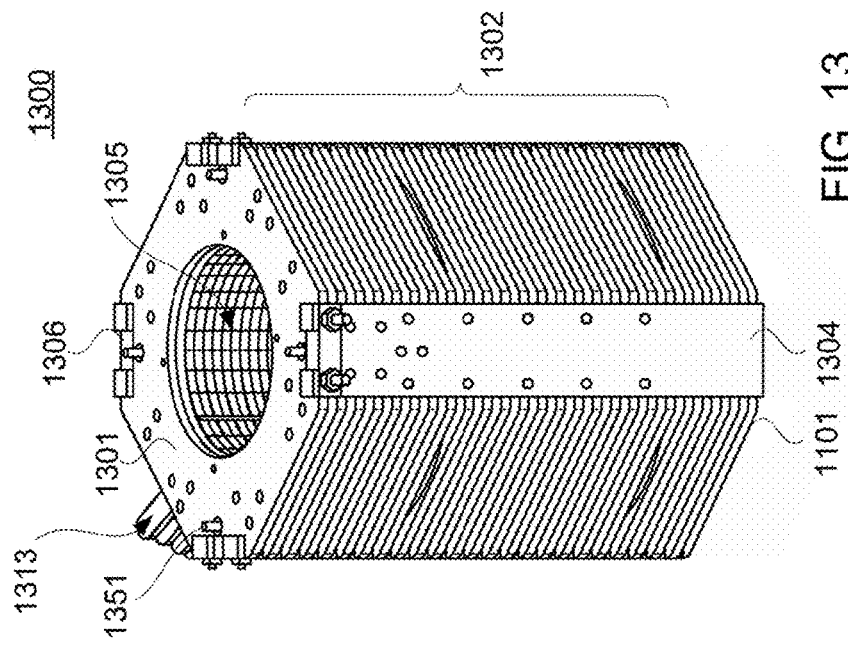
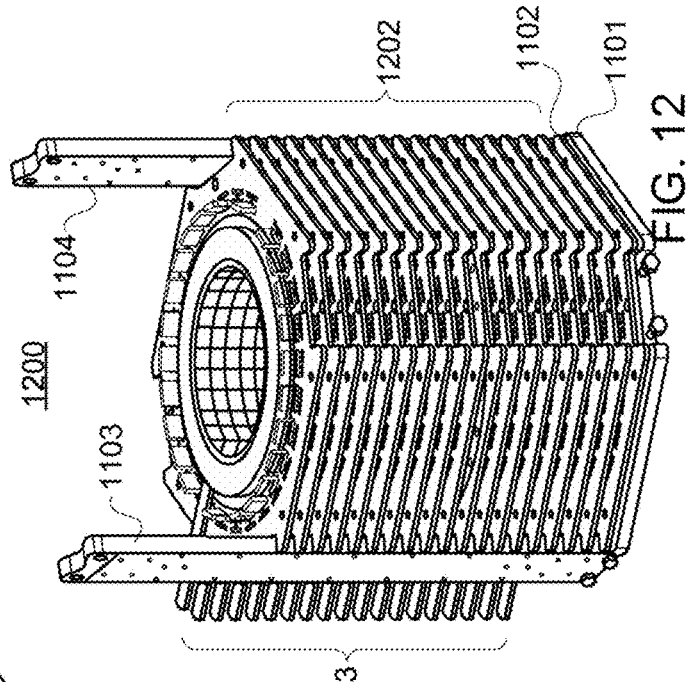
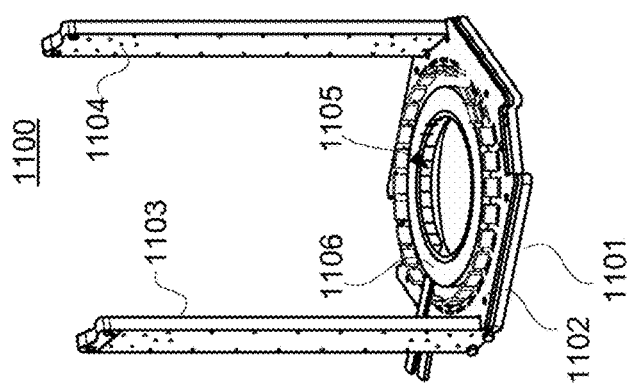

LINEAR ELECTROMAGNETIC MACHINE WITH A STATOR HAVING STATOR TEETH ARRANGED TO PROVIDE AN ANTI-CLOCKING FORCE

CROSS-REFERENCE TO RELATED APPLICATIONS

The present disclosure is directed towards linear electromagnetic machines, and, more particularly, linear electromagnetic machines having a translator, a stator and bearings. This application is a continuation of U.S. patent application Ser. No. 17/226,582 filed Apr. 9, 2021, which is a continuation of U.S. patent application Ser. No. 16/521,541 filed Jul. 24, 2019, now U.S. Pat. No. 10,985,641, which claims the benefit of U.S. Provisional Patent Application No. 62/702,860 filed Jul. 24, 2018, and U.S. Provisional Patent Application No. 62/703,338 filed Jul. 25, 2018, the disclosures of which are all hereby incorporated by reference herein in their entireties.

BACKGROUND

Linear motors convert between electrical energy and kinetic energy of a moving element. The design of linear motors must ensure efficient operation, cost effective construction, and reliability. In order to match the efficiency of rotary generators, it's necessary for a linear generator to be compatible with an inexpensive and lightweight oscillator design, employ high-efficiency materials, allow geometry optimization, and provide high copper slot fill. The present disclosure addresses all four requirements.

SUMMARY

In some embodiments, the present disclosure is directed to a linear electromagnetic machine (LEM). The LEM includes a stator, a translator, and two bearing housings. The stator includes a plurality of windings and a stator bore. The translator is configured to electromagnetically interact with the stator and is arranged to move axially within the stator bore substantially along the axis. The translator includes a translator bearing surface. A first of the two bearing housings is coupled to the stator at a first longitudinal location, and a second of the two bearing housings is coupled to the stator at a second longitudinal location. The first bearing housing and the translator bearing surface are capable of forming a first bearing gap and the second bearing housing and the translator bearing surface are capable of forming a second bearing gap. For example, the first and second bearing gaps may be configured to contain a pressurized gas, and function as a gas bearing. In a further example, in some embodiments, the LEM is configured for oil-less operation.

In some embodiments, the translator includes a magnet section. For example, the magnet section and the stator bore are capable of forming a motor air gap. In some embodiments, the magnet section includes a plurality of magnets arranged in longitudinally stacked rows. In some embodiments, an interior row of the longitudinally stacked rows includes magnets having a first axial length. In some such embodiments, a terminal row of the longitudinally stacked rows includes magnets having a second axial length less than the first axial length. In some embodiments, the translator includes at least one structural feature that engages at least one magnet of the magnet section to constrain axial motion of the at least one magnet. In some embodiments, the plurality of magnets are bonded to a surface of the translator.

In some embodiments, the translator includes a wrap positioned radially over the magnet section. For example, the wrap constrains lateral displacement of the magnets.

In some embodiments, the magnet section includes a first longitudinal length and the plurality of windings includes a second longitudinal length. The second longitudinal length may be greater than, equal to, or less than the first longitudinal length. In some embodiments, the magnet section includes a magnetic pole length and the stator includes a plurality of slots and teeth having a slot pitch. In some such embodiments, the magnetic pole length and the slot pitch are not substantially equal.

In some embodiments, the plurality of windings are grouped into a plurality of phases and each phase of the plurality of phases includes one or more windings of the plurality of windings. For example, in some embodiments, the plurality of phases is equal to or greater than three phases. In a further example, each winding of the plurality of windings corresponds to a phase.

In some embodiments, the magnet section includes a plurality of magnets and the stator includes a plurality of stator teeth arranged azimuthally around the stator bore. The plurality of stator teeth include a pair of consecutive stator teeth having a first azimuthal gap. The magnet section includes a second azimuthal gap between azimuthally consecutive magnets of the magnet section. The first azimuthal gap and the second azimuthal gap are configured to substantially maintain azimuthal alignment. In some embodiments, the first azimuthal gap is larger than the second azimuthal gap in the azimuthal direction. In some embodiments, the translator includes a feature configured to constrain azimuthal rotation.

In some embodiments, the first bearing housing is coupled to the stator by a first flexure assembly that is configured to provide mechanical stiffness at least to lateral displacement and the second bearing housing is affixed to the stator by a second flexure assembly that is configured to provide mechanical stiffness at least to lateral displacement.

In some embodiments, the present disclosure is directed to a linear machine. The linear machine includes a stator having a stator bore, a translator, at least one bearing housing that includes a surface, and an assembly configured to affix the at least one bearing housing to the stator. The translator is configured to move linearly relative to the stator. In some embodiments, the translator includes a magnet section and a bearing surface. The stator bore and the magnet section form a motor air gap. The bearing surface and the surface form a bearing interface that is capable of aligning the translator to the at least one bearing housing. The assembly provides relatively more stiffness to lateral displacement than to pitch and yaw of the bearing housing to maintain the motor air gap. In some embodiments, the bearing housings are axially located so as to allow the magnetic section of the translator to travel beyond an end of a stator, beyond an axial length of a hoop stack of a stator, or both.

In some embodiments, the translator includes a translator tube, the magnet section is affixed to the translator tube, and the bearing surface includes an outer surface of the translator tube.

In some embodiments, the assembly includes at least one mount rigidly affixed to the stator and at least one flexure affixed to the at least one mount and to the at least one bearing housing. The at least one flexure provides the relatively more stiffness to lateral displacement than to pitch and yaw of the bearing housing. In some embodiments, fixtures such as, for example, spherical joints may be used in lieu of, or in addition to flexures.

In some embodiments, the bearing housing extends at least partially azimuthally around the bearing surface and the at least one flexure extends at least partially azimuthally around the bearing housing.

In some embodiments, the bearing interface is a gas bearing interface, and the linear machine is configured for oil-less operation, or otherwise operation without liquid lubricant. In some embodiments, the bearing interface is a liquid or solid interface, and the linear machine is configured for oil-less operation. For example, pressurized gas is provided to the gas bearing to provide stiffness against lateral displacement.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

FIG. 11 shows a perspective view of an illustrative assembly including an end plate, one hoop-coil, and spines, in accordance with some embodiments of the present disclosure;

FIG. 12 shows a perspective view of an illustrative assembly including an end plate, some hoop-coils, and spines, in accordance with some embodiments of the present disclosure;

FIG. 13 shows a perspective view of an illustrative assembly stator, including an end plate, hoops, and spines, in accordance with some embodiments of the present disclosure;

DETAILED DESCRIPTION

The present disclosure is directed to linear electric machines, components thereof, and methods of controlling linear electric machines. A linear electric machine includes a stationary component, the stator, and a movable portion, the translator. The stator and the translator are configured to interact with each other electromagnetically. For example, the stator may include one or more phases and the translator may include a magnet section that includes one or more magnets. Motion of the translator may be affected by electrical current in windings of the phases. To illustrate, currents in the phases may be controlled to move the translator by applying a force in the direction of motion of the translator (e.g., act as a motor), or currents in the phases may be controlled to decelerate (i.e., brake) the translator by applying a force opposite the direction of motion of the translator (e.g., act as a generator). Alternatively, in a linear electrical system such as a generator, current induced in the windings may be extracted as electrical energy. A bearing system maintains alignment of the translator relative to the stator, and possible other components to achieve a desired or predictable trajectory. For example, a bearing system may constrain motion of the translator in directions away from the intended trajectory.

Figure 1:
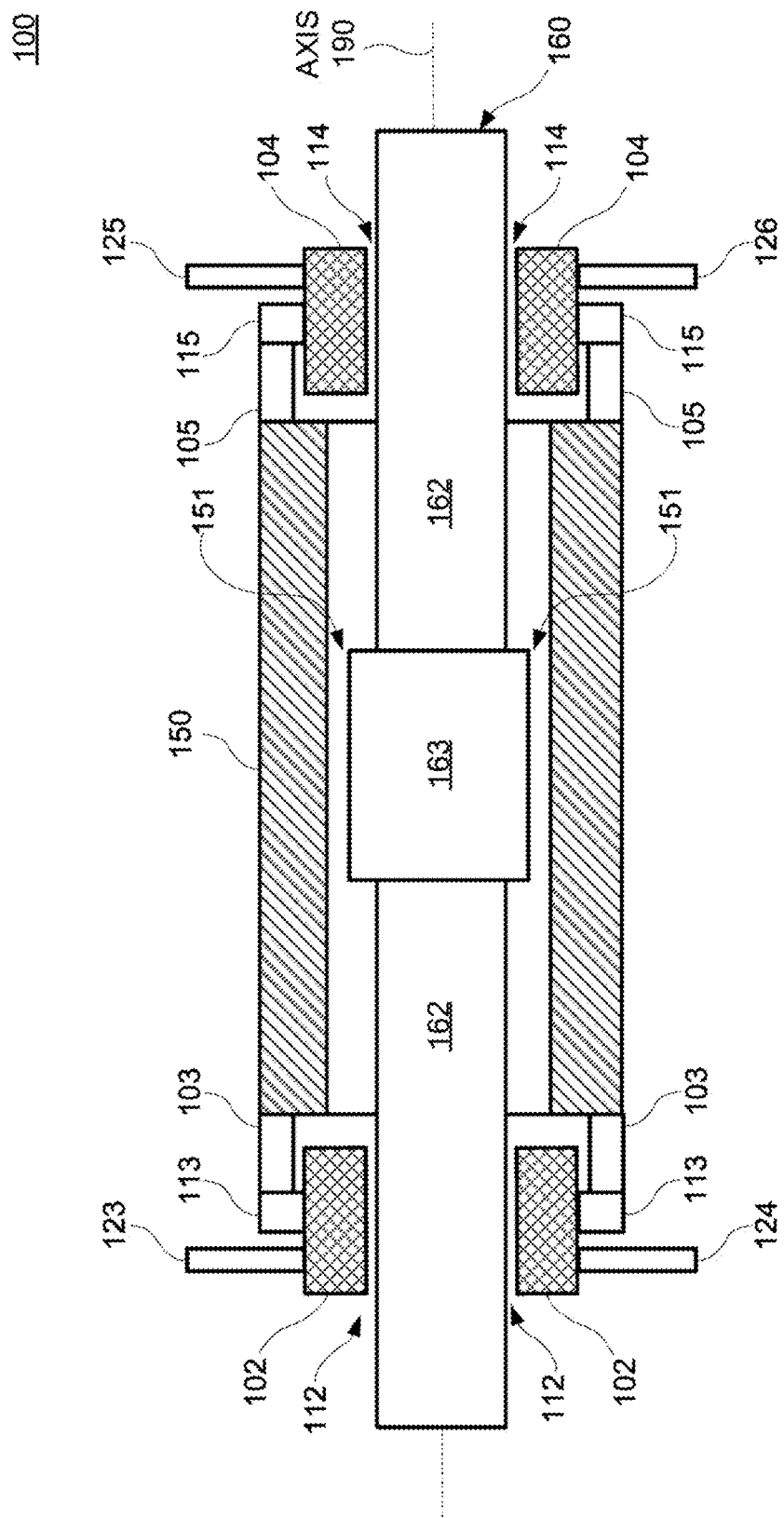
FIG. 1 shows a cross-sectional view of an illustrative linear electromagnetic machine, in accordance with some embodiments of the present disclosure.
Figure 2:
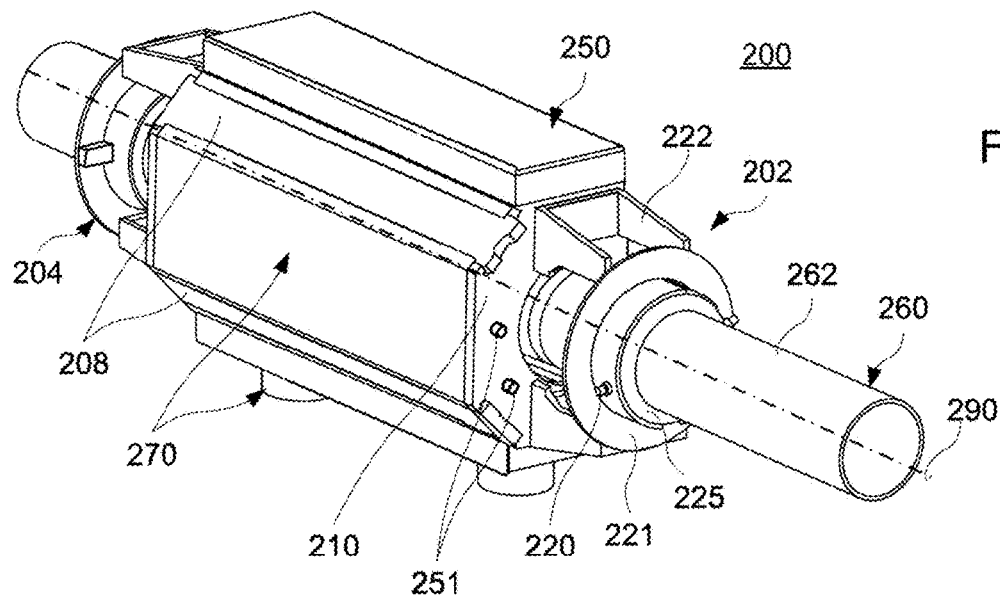
FIG. 2 shows a perspective view of an illustrative linear electromagnetic machine with cooling, in accordance with some embodiments of the present disclosure.
Figure 3:
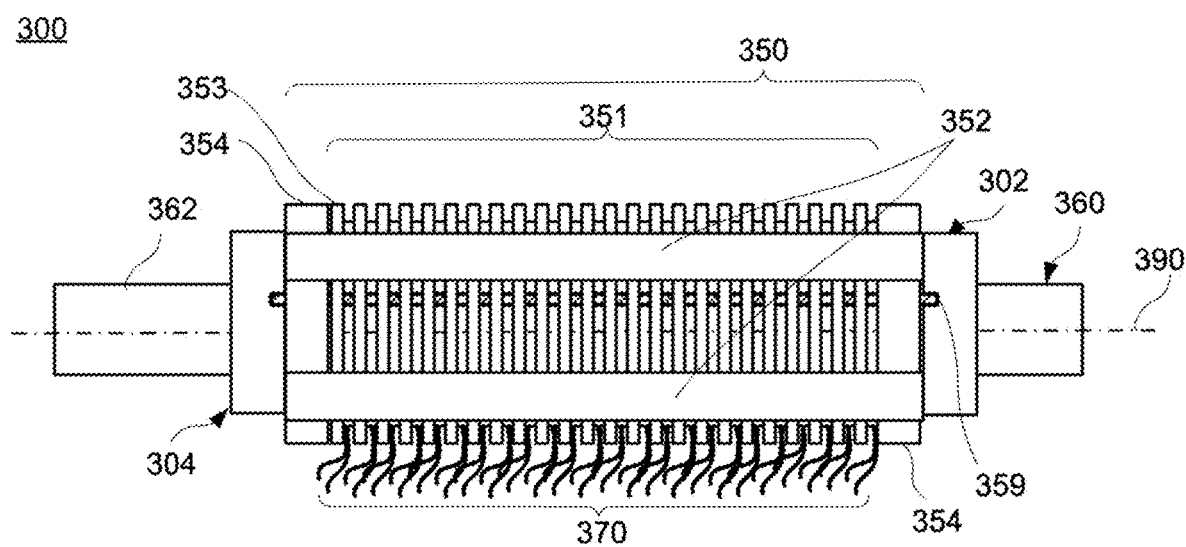
FIG. 3 shows a perspective view of an illustrative linear electromagnetic machine including a hoop stack and spines, in accordance with some embodiments of the present disclosure.

FIGS. 1-3 show illustrative linear electromagnetic machines (LEM), in accordance with some embodiments of the present disclosure.

FIG. 1 shows a cross-sectional view of illustrative LEM 100, in accordance with some embodiments of the present disclosure. LEM 100 includes translator 160, stator 150, bearing housings 102 and 104, bearing mounts 103 and 105, flexures 113 and 115, features 123-126, and bearing interfaces 112 and 114. Translator 160 includes tube 162 and section 163 configured to interact electromagnetically with stator 150. For example, section 163 (also referred to as an "electromagnet section" or "magnet section") may include a magnet section having permanent magnets, electromagnets, an induction section, or a combination thereof. Although referred to as a tube, tube 162 may have any suitable cross-sectional shape, and accordingly bearing interfaces 112 and 114 may have a corresponding shape. For example, in some embodiments, tube 162 may have a rectangular cross section, and accordingly bearing interfaces 112 and 114 may be flat rather than annular. In a further example, in some embodiments, tube 162 may have at least one circular cross section for a first longitudinal distance (i.e., axial distance) and at least one rectangular cross section for a second longitudinal distance, where the first and second longitudinal distances may be equal or different.

Stator 150 and section 163 interact electromagnetically to cause motion of translator 160, affect motion of translator 160, convert kinetic energy of translator 160 (e.g., based on the mass on velocity of translator 160) to electrical energy (e.g., in windings of phases of stator 150 and, if desired, power electronics coupled thereto), convert electrical energy (e.g., in windings of phases of stator 150 and, if desired, power electronics coupled thereto) into kinetic energy of translator 160, or a combination thereof. Motor gap 151 (as referred to as "motor air gap") between stator 150 (e.g., laminated ferrous teeth thereof) and section 163 (e.g., permanent magnets thereof) affects reluctance of the electromagnet magnetic interaction between stator 150 and translator 160. For example, the smaller motor gap 151, the larger the motor force constant (e.g., larger magnetic flux) that can be achieved between stator 150 and translator 160. However, if motor gaps 151 nears zero (e.g., at one or more locations), translator 160 may contact stator 150 causing friction, impact, deformation, electrical shorts, reduced performance, failure, or any combination thereof. Accordingly, bearings are used to maintain the lateral alignment of stator 150 and translator 160 (e.g., to maintain motor gap 151 in an operable range).

In some embodiments, as illustrated, bearing housings 102 and 104 are affixed to stator 150 by bearing mounts 103 and 105, and flexures 113 and 115. For example, rigidly affixing bearing housings 102 and 104 to stator 150 may help in counteracting lateral (e.g., radial) loads on translator 160. In some embodiments, one or both of bearing housings 102 and 104 may be coupled to stator 150 by flexures 113 and 115, having prescribed a stiffness or compliance in one or more directions. In some embodiments, flexures 113 and 115 may be affixed to stator 150, and bearing mounts 103 and 105 need not be included. In some embodiments, flexures 113 and 115 need not be included, and bearing mounts 103 and 105 may be affixed to bearing housings 102 and 104, respectively. In some embodiments, one or both bearing housings 102 and 104 need not be affixed to stator 150 and may be affixed to any other suitable stationary component (e.g., an external frame). In some embodiments, only one bearing housing (e.g., bearing housing 102 or bearing housing 104) is needed. To illustrate, the cantilever mounting of the bearing housing to support the translator may provide minimal constraints on the translator which provides more tolerance to misalignments.

In some embodiments, one or both bearing interfaces 112 and 114 are configured as contact bearings. In some embodiments, one or both bearing interfaces 112 and 114 are configured as non-contact bearings. In some embodiments, one or both bearing interfaces 112 and 114 are configured as gas bearings (e.g., a type of non-contact bearing). In some such embodiments, one or both bearing housings 102 and 104 are configured to receive bearing gas from features 123-126, which may include respective ports for receiving respective bearing gas supplies. For example, referencing a tubular geometry, each of bearing housings 102 and 104 may include a bearing surface arranged at a radially inward surface, configured to interface to respective annular gas bearings in bearing interfaces 112 and 114. Tube 162 may include a cylindrical bearing surface configured to interface to annular bearing interfaces 112 and 114. During operation, bearing interfaces 112 and 114 allow translator 160 to move along axis 190 with low or near-zero friction, and prevent substantial lateral (e.g., radial) motion off from axis 190. For example, bearing interfaces 112 and 114 may be configured to maintain motor air gap 151 between stator 150 (e.g., iron stator teeth and copper windings thereof) and section 163 during operation. It will be understood that bearing interfaces 112 and 114, and motor air gap 151 may respectively have any suitable thickness. For example, in general the thicknesses are preferred to be as thin as possible while ensuring reliable operation. In some embodiments, bearing interfaces 112 and 114 are configured to be 20-150 microns thick and motor air gap 151 is configured to be 20-40 mm thick.

In an illustrative example, in which bearing interfaces 112 and 114 are configured as gas bearings, bearing gas is configured to exit bearing housings 102 and 104 (e.g., to form respective gas bearings in bearing interfaces 112 and 114) in a substantially radially inward direction (i.e., streamlines directed towards axis 190). Bearing gas may flow through porous sections of bearing housings 102 and 104, ducts and orifices within bearing housings 102 and 104, or a combination thereof, to reach respective bearing interfaces 112 and 114.

In some embodiments, bearing housings 102 and 104 may include a coating, a consumable layer, a dry film lubricant, an abradable coating, or a combination thereof, at corresponding bearing surfaces to accommodate, for example, contact with translator 160 while limiting or avoiding damage to the translator, bearing housing, or both. In some embodiments, translator 160 may include a coating, a consumable layer, a dry film lubricant, an abradable coating, or a combination thereof, to accommodate, for example, contact with bearing housings 102 and 104 while limiting or avoiding damage to the translator, bearing housing, or both. In some embodiments, a bearing housing extends fully and continuously (e.g., 360° azimuthally) around a translator. In some embodiments, a bearing housing includes one or more bearing segments that extend for an azimuthal range around a translator that is less than 360°. For example, a bearing housing may include four bearing segments each extending about ninety degrees around the translator, with azimuthal gaps in between the bearing segments. A bearing housing may include any suitable number of bearing segments having any suitable number of gaps, and arranged in any suitable configuration, around a translator.

Figure 36:
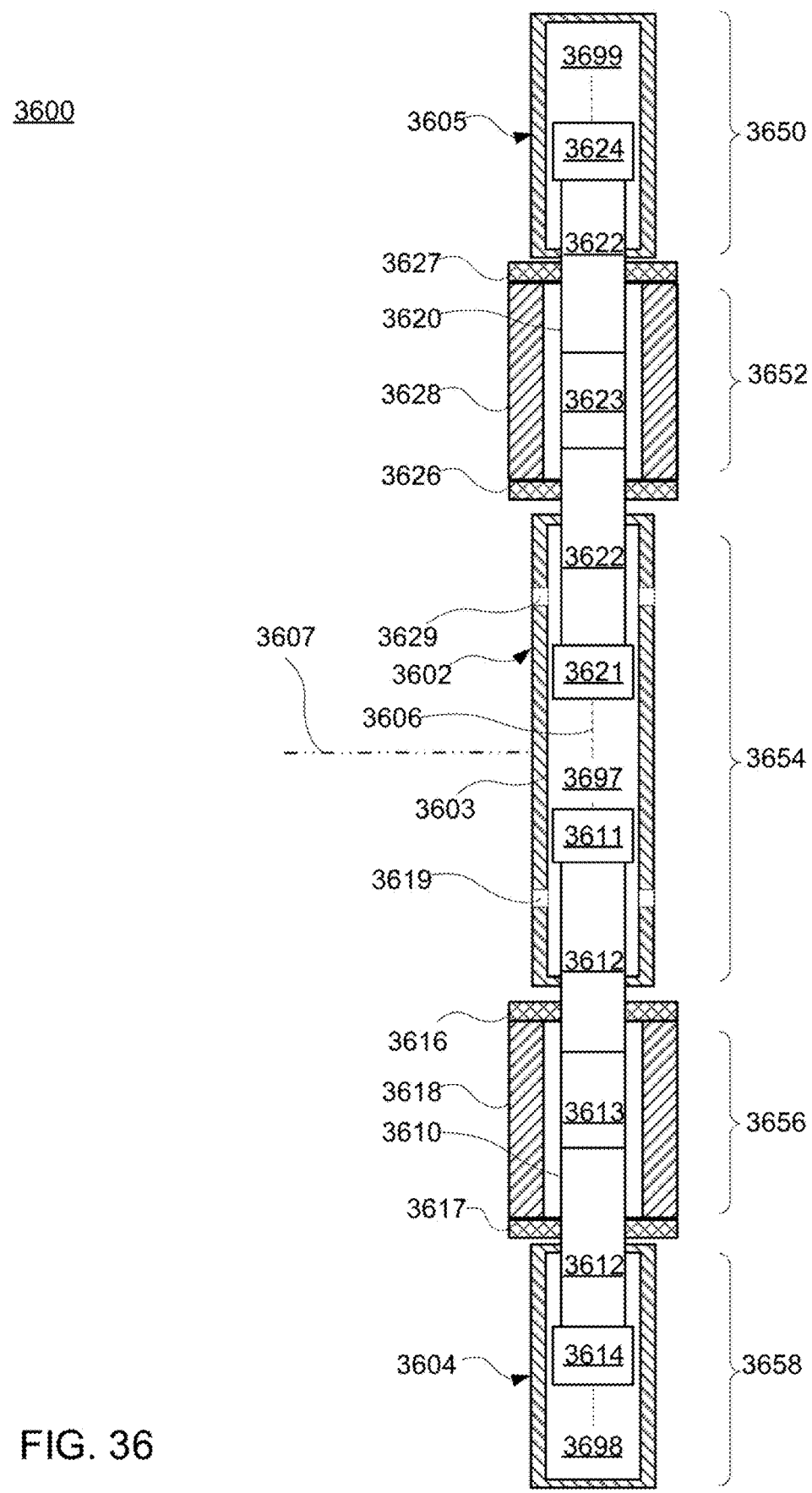
FIG. 36 shows a cross-sectional side view of an illustrative generator assembly, in accordance with some embodiments of the present disclosure.

In some embodiments, translator 160 may include one or more pistons or end caps affixed to axial ends of tube 162. For example, tube 162 may act as a rigid body coupling the pistons and other components to form a rigid translator. In a further example, LEM 100 may be included as part of a linear generator (e.g., as illustrated in FIG. 36), in which one piston is configured to contact a reaction section and the other piston is configured to contact a gas spring. Although section 163 is illustrated in FIG. 1 as being axially shorter than stator 150, section 163 may be axially shorter, longer, or the same length as stator 150, in accordance with some embodiments of the present disclosure. In some embodiments, whether section 163 is longer, shorter, or the same length as stator 150, section 163 or portions thereof may be capable of being positioned axially outside of stator 150 (e.g., axially beyond ends of stator 150).

FIG. 2 shows a perspective view of illustrative LEM 200 with cooling, in accordance with some embodiments of the present disclosure. LEM 200 includes stator 250, translator 260, bearing assemblies 202 and 204, and cooling system 270. Translator 260 is configured to move along axis 290, as constrained by bearing assemblies 202 and 204. Stator 250, which may include a plurality of phases, is configured to interact electromagnetically with a section of translator 260 that may include permanent magnets, an electromagnet, an induction section, or a combination thereof. Bearing assemblies 202 and 204 may each include one more bearing housings, one or more mounts, one or more flexures, any other suitable components, or any suitable combination thereof to form a bearing interface with translator 160 (e.g., with surface 262 thereof that may act as a bearing surface).

In some embodiments, LEM 200 may be configured for air cooling, liquid cooling, or both. Cooling system 270 may include plenums, jackets, shrouds, shields, vanes, any other suitable hardware, or any combination thereof to guide a cooling fluid around components of stator 250. For example, LEM 200 may be configured for air-cooling, and cooling system 270 may include a cooling jacket, shroud, or both configured to receive and guide cooling air throughout stator 250. In a further example, LEM 200 may be configured for liquid cooling, and cooling system 270 may include a cooling jacket configured to receive and guide cooling fluid through stator 250. In some embodiments, as illustrated, stator 250 includes spines 208, and end plates 210, which are described further in the context of FIGS. 4-13, for example. As illustrated, bearing assembly 202 includes, bearing housing 225, flexure 221, mount 222, and feature 220 (e.g., which may include a feature for adjusting bearing stiffness, or a port for bearing gas). In some embodiments, tie-rods 251 are included to provide axial compression to components of stator 250. For example, tie-rods 251 may include sections (e.g., threaded sections) at each end that extend axially through end plates 210, and washers, nuts, crimp connectors, or other terminations are affixed to the sections to engage endplates 210 and maintain compression.

FIG. 3 shows a perspective view of illustrative linear electromagnetic machine 300 including hoop stack 351 and spines 352, in accordance with some embodiments of the present disclosure. Hoop stack 351 includes a plurality of hoops (e.g., including hoop 353 shown for reference) arranged along axis 390 to form a stator bore (e.g., formed by stator teeth affixed to hoops of hoop stack 351). Hoop stack 351, as illustrated, includes end plates 354, which are arranged on respective axial ends of the plurality of hoops for structural support. Spines 353 are coupled to end plates 354 and the hoops of hoop stack 351 to maintain alignment of the hoops. In some embodiments, one or more optional tie-rods 359 may be included to provide axial compression to hoop stack 351 (e.g., tie-rods 359 may engage with end plates 354). Bearing assemblies 302 and 304 maintain alignment (e.g., lateral alignment of a motor gap) between stator 350 and translator 360. Further description of hoops, coils, stator teeth, and assemblies thereof are described in the context of FIGS. 4-13, for example. A plurality of phase leads 370 corresponding to coils of hoop stack 351.

A stator is a LEM component configured to accommodate current in one or more phases, electromotive force in the one or more phases, or both, to provide an electromagnetic interaction with a translator. The electromagnetic interaction includes a magnetic flux interaction (e.g., with a motor air gap affecting the reluctance), a force interaction (e.g., with a force constant affecting the current-force relationship), or both.

Figure 4:
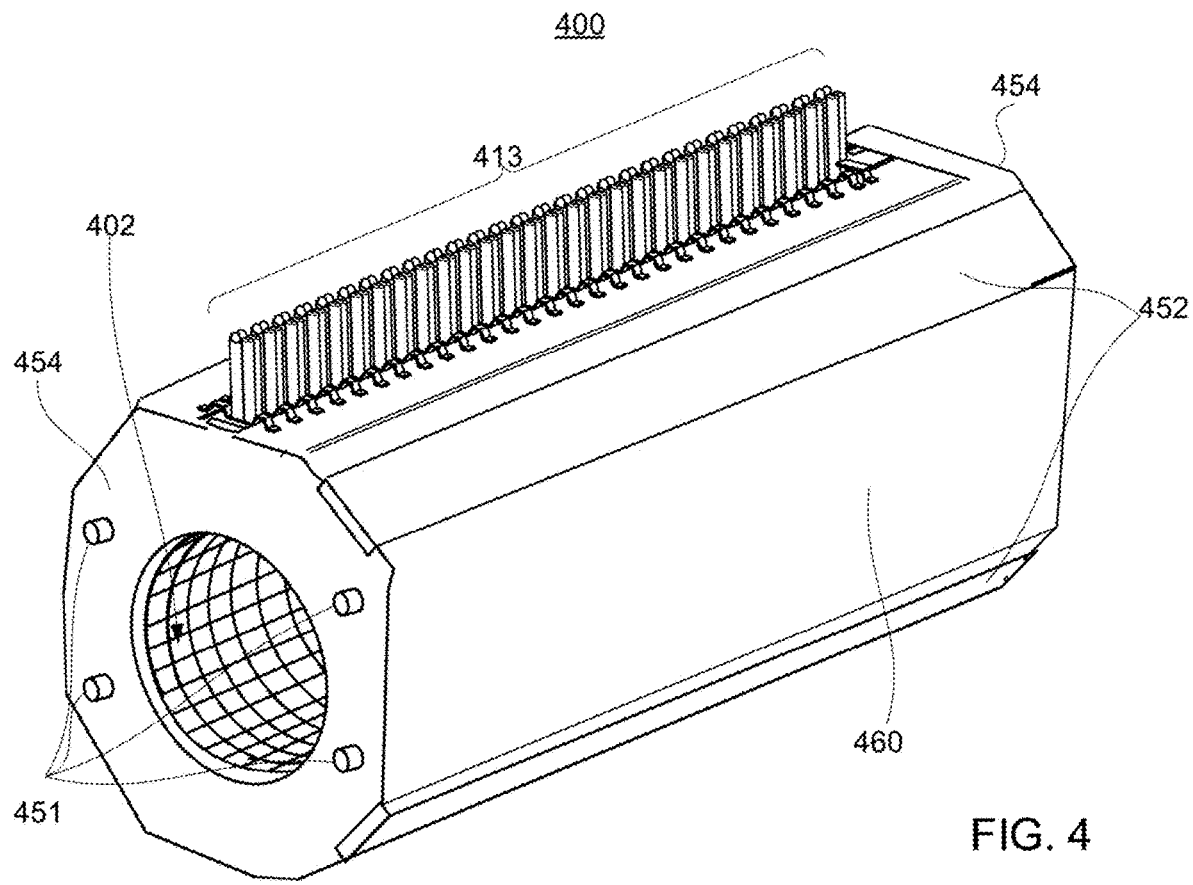
FIG. 4 shows a perspective view of an illustrative stator, in accordance with some embodiments of the present disclosure.

FIG. 4 shows a perspective view of illustrative stator 400, in accordance with some embodiments of the present disclosure. Stator 400 includes a plurality of stator teeth 402 (e.g., ferrous elements, lamination stacks, or both), arranged to form a stator bore, as illustrated. Although shown as circular, stator teeth may define any suitable compound surface that may define a motor air gap (e.g., flat, curved, segmented, piecewise, circular, non-circular, or otherwise). In some embodiments, spines 452, end plates 454, and tie-rods 452, or any combination thereof, provide structural support to maintain alignment of stator 400. Leads 413 from the plurality of windings of stator 400 may be directed to power electronics, coupled among subsets of themselves (e.g., to form a star neutral, to couple two or more windings directly in series), or a combination thereof. Although not shown in FIG. 4, one or more bearing housings may be affixed to stator 400 for constraining lateral displacement of a translator configured to interact electromagnetically with stator 400 (e.g., forming a motor air gap with stator 400). In some embodiments, tie-rods 451 are included to provide axial compression to components (e.g., hoop-coils, stator teeth 402, or both) of stator 400.

Figure 5:
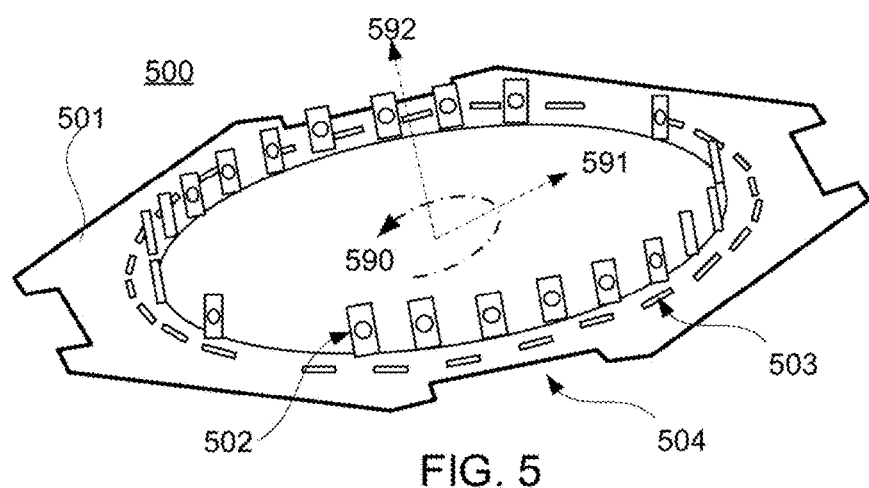
FIG. 5 shows a perspective view of an illustrative hoop, in accordance with some embodiments of the present disclosure.

A stator (e.g., stator 400) may include a plurality of ferrous elements for directing magnetic flux. These ferrous elements, or "stator teeth," may include some number of lamination stacks (e.g., shown in FIG. 6) arranged in a circular pattern (e.g., arranged by a hoop as illustrated in FIGS. 5 and 7). The lamination stacks are each a linear stack that together, when arranged in a circle, may approximate a circular stator bore. The inclusion of more stator teeth may provide a more uniform air gap (e.g., between the teeth and a translator having a magnet section), allow tighter air gaps, potentially allow for better motor performance, or a combination thereof. The inclusion of fewer stator teeth may reduce part count and assembly cost. In some embodiments, in order to achieve high reliability, a cooling system provides stator and winding cooling, the stator is configured for easy-to-route phase leads, the stator is configured to allow space for insulating material (e.g., dielectric insulation, thermal insulation, or both), or a combination thereof.

FIG. 5 shows a perspective view of illustrative hoop 500, in accordance with some embodiments of the present disclosure. Hoop 500 is configured to accommodate a set of stator teeth arranged at least partially azimuthally around axis 590 of hoop 500 (e.g., the azimuthal direction is around axis 592). For reference with regard to a stator, as illustrated in FIG. 5, axis 592 represents the axial direction (i.e., longitudinal), axis 591 represents the radial direction (i.e., lateral), and axis 590 represents the azimuthal direction. Hoop 500 includes body 501 (e.g., the main structural portion or a "stiffening ring"), optional recesses 504 configured to accommodate or otherwise engage with one or more spines, optional anti-racking tabs 502, and optional docks 503. For example, four recesses 504 are illustrated in FIG. 5, although any suitable number of recesses may be included to accommodate corresponding spines. In some embodiments, the hoop includes no recesses and the spines connects to the hoop 500 with or without any additional features. Anti-racking tabs 502 extend axially from body 501 and are configured to prevent azimuthal or lateral deformation of laminations of stator teeth. Anti-racking tabs 502 may, in some embodiments, include one or more holes or other features configured to allow cooling air flow to permeate the stator (e.g., to flow through anti-racking tabs 502 to windings and stator teeth). Docks 503 are configured to accommodate or otherwise engage features of stator teeth to maintain position of stator teeth, react forces on stator, or both. Hoop 500 may be constructed of metal, sheet metal, plastic, or any other sheet material, including any suitable processing (e.g., bending, breaking, pressing/stamping, cutting, brazing, welding, adhering, or otherwise) to form shapes, form features, attach features, or any combination thereof (e.g., anti-racking tabs 502, recessing 504, docks 503).

Figure 6:
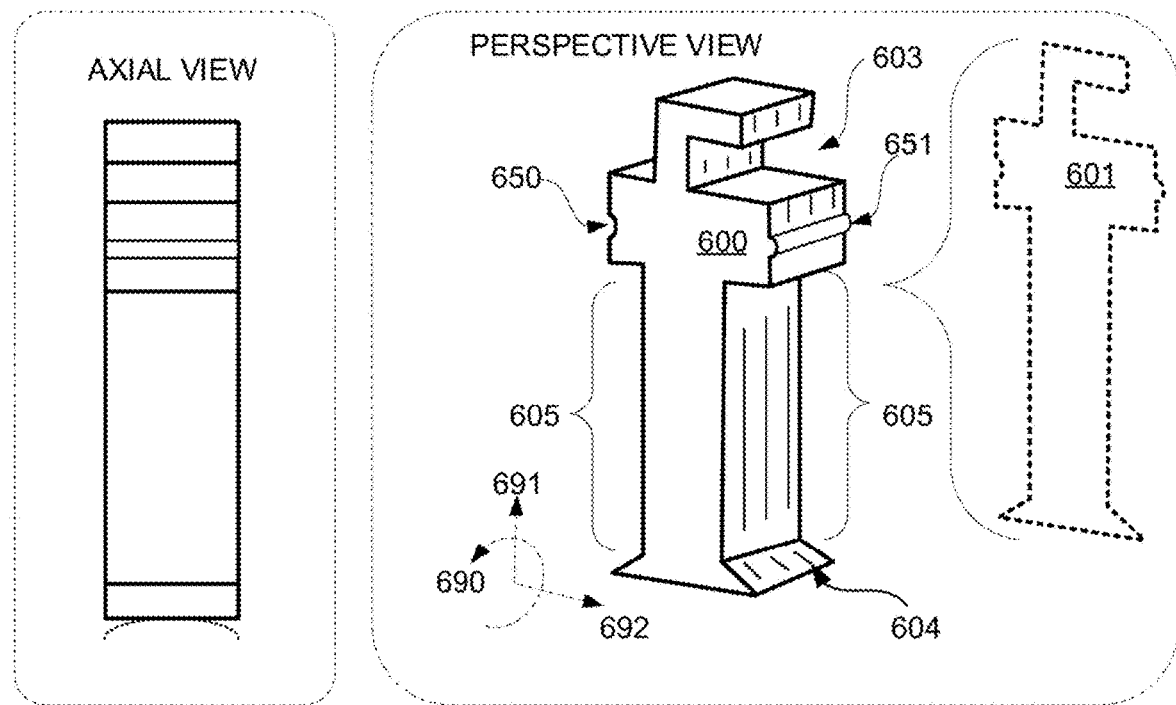
FIG. 6 shows an axial view and a perspective view of an illustrative stator tooth, which includes a plurality of laminations, in accordance with some embodiments of the present disclosure.
Figure 7:
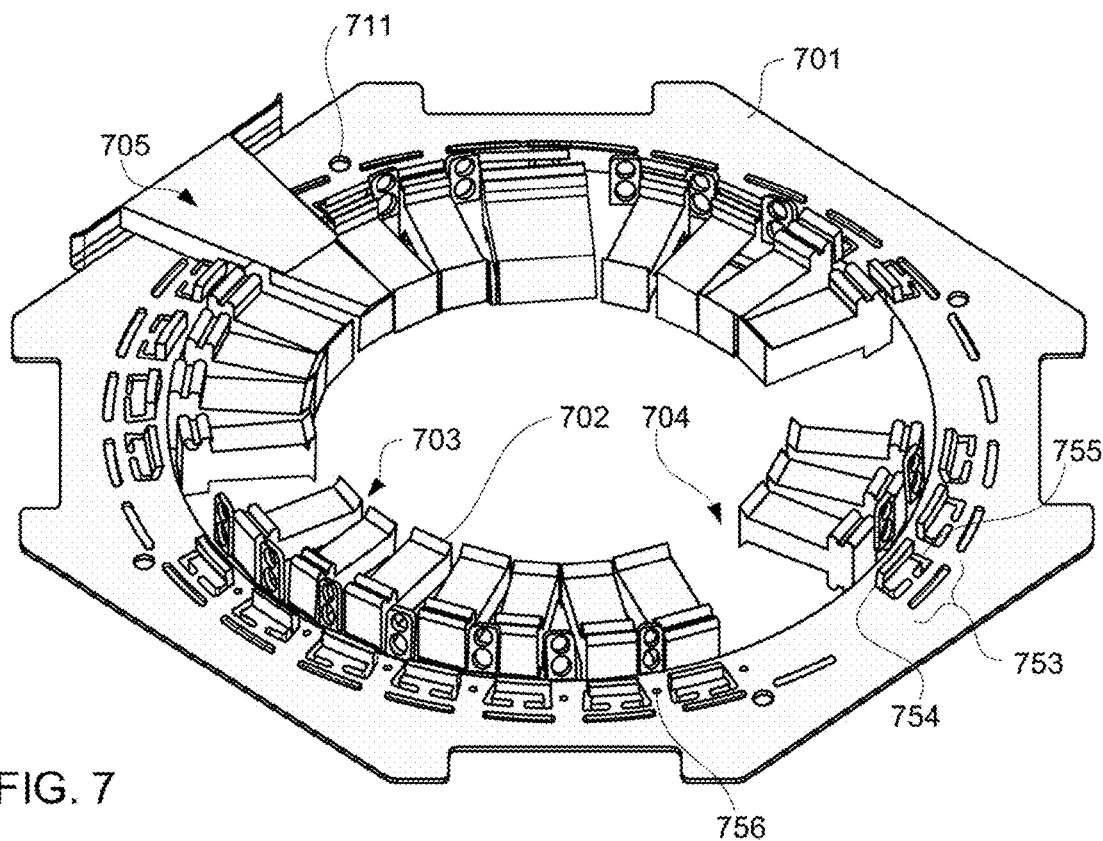
FIG. 7 shows a perspective view of an illustrative hoop with a set of stator teeth arranged, in accordance with some embodiments of the present disclosure.

FIG. 6 shows an axial view and a perspective view of illustrative stator tooth 600, which includes a plurality of laminations, in accordance with some embodiments of the present disclosure. Lamination 601 is shown to illustrate a thin sheet of material, of which a stator tooth is formed. A plurality of laminations similar to 601, although they need not be identical, are stacked to form stator tooth 600. For example, a plurality of steel laminations may be cut from sheet metal (e.g., by punching, laser cutting, plasma cutting, wire EDM, water jet cutting, or any other cutting technique), and affixed (e.g., bonded, interlocked, welded, cleated, or any other suitable means) to one another to form a lamination stack (i.e., stator tooth 600). For reference with regard to a stator, as illustrated in FIG. 6, axis 692 represents the axial direction, axis 691 represents the radial direction, and axis 690 represents the azimuthal direction (e.g., azimuthal around axis 692). As illustrated, stator tooth 600 includes features 650 and 651 for axial engagement of stator teeth. Features 650 an 651 may include bosses, recesses, grooves, slots, steps, raised portions, any other suitable geometric feature for engaging an axially adjacent stator tooth (e.g., affixed to an adjacent hoop), or any combination thereof. In some embodiments, features 650 and 651 provide indexing features for assembly of a hoop stack (e.g., hoop stack 351 in FIG. 3), aid in alignment of a hoop stack, or both.

Region 605 represents a recess configured to accommodate one or more windings. For example, regions similar to region 605 of stator teeth at a particular axial location align to form a void volume in which electronically conductive windings (e.g., of coils) can be wound or otherwise inserted. In some embodiments, stator tooth 600 or region 605 thereof is wrapped or otherwise covered with an electrically insulating material (e.g., such as Nomex sheeting) to prevent windings from electrically shorting to stator tooth 600. In alternative embodiments, the electrically conductive windings is wrapped or otherwise covered with an electrically insulating material (e.g., such as Nomex tape) to prevent the windings from electrically shorting to stator tooth 600. Feature 603, which includes a notch as illustrated, is configured to allow stator tooth 600 to engage with a hoop (e.g., as illustrated in FIG. 7). For example, feature 603 may engage with dock 503 of hoop 500 of FIG. 5. Stator tooth tip 604 (also referred to as a stator tooth tip) is used to define, along with like features of a plurality of stator teeth, a stator bore. In some embodiments, the shape of the stator tooth tip 604 may be flat in an azimuthal direction (e.g., in the direction of 690). In alternative embodiments, the shape of the stator tooth tip 604 may have a convex, concave or any other appropriate shape required to provide a desirable stator bore surface. As illustrated by the dotted contour in the face view, tooth tip 604 may be curved or otherwise contoured to more closely approximate a circle (e.g., a circular stator bore).

In an illustrative example, lamination 601 may include thin, low-loss, high-permeability lamination steel. In a further illustrative example, lamination 601 may cause a stator tooth shape optimized to form a motor air gap and provide high copper slot fill (e.g., more windings, or turns of windings). As illustrated in FIG. 6, the laminations (e.g., lamination 601) of stator tooth 600 have sufficiently uniform thickness such that stator tooth 600 has a rectangular profile when viewed in the axial direction. In some embodiments, the thickness of lamination 601 need not be uniform. For example, lamination 601 may have a smaller thickness at the tooth tip 604 than at the outer radial end (e.g., where feature 603 is located) such that when stator tooth 600 is formed the stator tooth 600 forms a V-like profile when viewed in the axial direction (e.g., the inner surface of the stator tooth is smaller than the outer surface area of the stator tooth). This V-like profile may reduce or eliminate the azimuthal gap between adjacent stator teeth at the outer diameter of a set of stator teeth (e.g., as shown by ring of stator teeth in FIG. 7), thereby increasing the amount of steel material in the stator, which could reduce the flux density and increase efficiency.

FIG. 7 shows a perspective view of illustrative hoop 701 with set of stator teeth 702 arranged ("hoop-teeth assembly"), in accordance with some embodiments of the present disclosure. Set of stator teeth 702 locally define stator bore 703 at a particular axial position or position range. Each tooth of set of stator teeth 702 engages with a dock of hoop 701 (e.g., of which dock 753 is one). In some embodiments, each dock 753 includes feature 754 (e.g., a slot as illustrated) that engages with a stator tooth (e.g., of stator teeth 702) and feature 755 (e.g., a flexure, as illustrated) for maintaining engagement. In some embodiments, set of stator teeth 702 may be welded, brazed, glued, crimped, or otherwise affixed to hoop 701, and feature 755 may be but need not be included. Feature 756 (e.g., one or more holds as illustrated) is configured to provide a path for cooling air to flow, to help cool the coils (or windings thereof), stator teeth, hoops, spines, tie-rods, or a combination thereof. In some embodiments, feature 756 may be selectively covered to divide sections of a stator into two or more cooling zones.

In some embodiments, as illustrated, set of stator teeth 702 include azimuthal gap 704 which is configured to provide an anti-rotation force on a translator, configured to allow a feature of a translator to move thin (e.g., a rail), allow coil leads to be routed away from the windings, or any combination thereof. In some embodiments, lead cover 705 may be included to guide coil leads away from the windings, provide for alignment of stator teeth, or both. For example, lead cover 705 may be comprised of internal passages to route or guide coil leads away from the windings. Additionally, lead cover 705 may be comprised of a dielectric material (e.g., a plastic) to electrically insulate the coil leads from the set of stator teeth 702 and stiffening ring 701. In some embodiments, one or more azimuthal gaps at stator bore 703 may be included among the set of stator teeth. In some embodiments, no substantially distinct azimuthal gaps at stator bore 703 are included among the set of stator teeth. In some embodiments, one or more azimuthal gaps at stator bore 703 are included and configured to provide anti-rotation forces. Feature 711 (e.g., one or more holes as illustrated) may be included to accommodate a tie-rod, provide an axial cooling path for cooling air, or both.

In an illustrative example, a hoop may be a stamped part, used to control the circularity of a single tooth-array. The hoop together with any suitable number of or type of spines and any suitable number of or type of end plates control straightness of the stator bore when many tooth arrays are stacked in series axially. A hoop may include any suitable features to affix, engage, preload, or any combination thereof, the lamination stack onto their alignment positions to reliably define the stator bore, allow snap-together assembly, or both. The stacked assembly allows the use of stator tooth tips (e.g., as shown in FIG. 6) to improve motor efficiency and reduce magnet losses, while still allowing for easy coil insertion, good slot fill, and simple stator assembly. In some embodiments, stator teeth include alignment bosses and pockets, stamped in the lamination to provide positive alignment when axially stacking multiple tooth arrays together.

In some embodiments, a stack of hoop-teeth assemblies is put into compression to improve the stiffness of the stator assembly. In some embodiments, a hoop-teeth assembly may be assembled under compression and fixed in position by tie rods, welds, glue, or a combination thereof. In some such embodiments, it may be necessary to include features (e.g., tabs) to prevent the individual lamination stacks or stator teeth from buckling or racking when loaded in compression (e.g., through the use of anti-racking tabs). These features could be separate pieces, or they could be integrated into the hoop design.

In some embodiments, a set of stator teeth may include azimuthal gaps at the radially outer region of the ring of stator teeth (e.g., based on the tooth design). These gaps may be filled or otherwise avoided by including stator tooth laminations with a greater thickness at the radially outer ends (e.g., so the stator tooth tapers in azimuthally at lesser radii). For example, when viewed axially, a stator tooth may have a V-shape in the radial direction instead of uniform thickness. The use of a V-shape may improve electromagnetic performance, but may increase resistance to the flow of cooling fluid through the stator.

Figure 8:
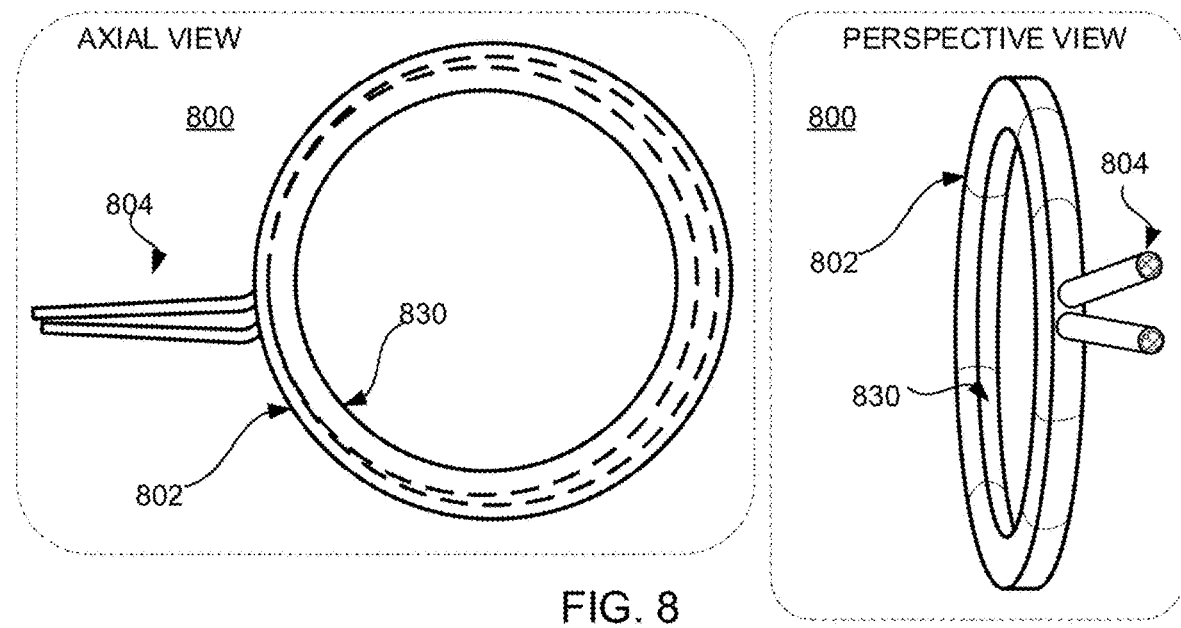
FIG. 8 shows an axial view and a perspective view of an illustrative coil, in accordance with some embodiments of the present disclosure.

FIG. 8 shows an axial view and a perspective view of illustrative coil 800, in accordance with some embodiments of the present disclosure. Coil 800 includes winding 802 and leads 804. In some embodiments, as illustrated, coil 800 includes a length of an electronically conductive material wrapped in in a suitable shape (e.g., circular as illustrated) to form the winding (i.e., winding 802). The remaining portion of the electronically conductive material forms the leads (i.e., leads 804). For example, leads 804 may be coupled to other leads (e.g., of other coils), power electronics, electrical terminals, a neutral wye connection, any other suitable connection, or any combination thereof. In an illustrative example, when coil 800 is included in a phase controlled by a full bridge, both leads 804 may be coupled to suitable nodes of an H-bridge circuit for current control. In a further illustrative example, when coil 800 is included in a phase controlled by a half bridge, one of leads 804 may be coupled to a suitable node of the half-bridge circuit for current control, and the other lead of leads 804 may be connected to a neutral wye. In a further illustrative example, when coil 800 is included in a phase, leads 804 may be coupled to leads of other coils (e.g., the phase includes more than one coil).

In some embodiments, coil 800 may be formed from copper wire, aluminum wire, any other suitable metal wire, or any combination thereof. For example, copper wire having N laminated strands (e.g., where N is an integer) may be wound (e.g., around a mandrel or other tool to define coil bore 830) to form windings 802, and the unwound ends form leads 804 (e.g., of any suitable length). In some embodiments, as illustrated, winding 802, leads 804, or both may be wrapped with an electronically insulating material to prevent shorting (e.g., such as Nomex, Kapton, or other suitable material or materials). In some embodiments, leads 804 include electrical terminations (e.g., crimped connectors, soldered ends, or other suitable components or treatments) at the ends. In some embodiments, coil bore 830 is the same as or larger than a stator bore. For example, coil bore 830 may be larger than a stator bore to prevent windings 802 from incidental contact with a translator. In a further example, coil bore 830 may be larger than a stator bore, with radially inner portions of stator teeth being arranged radially inward of coil bore 830. A plurality of coils, each similar to coil 800, may be included in a stator (e.g., stator 400 of FIG. 4), making up phases of the stator. For example, each phase may include one or more coils, electrically coupled in series. In a further example, each phase may include one coil. In some embodiments, a coil, or a winding thereof, may be formed using bondable wire, wire with bondable insulation, or both. For example, the coil is formed and then the coil, or winding portion thereof, is heated (e.g., baked in an oven) to set. A coil may include wire having any suitable cross section such as, for example, round, square, or any other suitable shape.

A coil may include wire of any suitable material such as, for example, copper, aluminum, or any other suitable wire.

Figure 9:
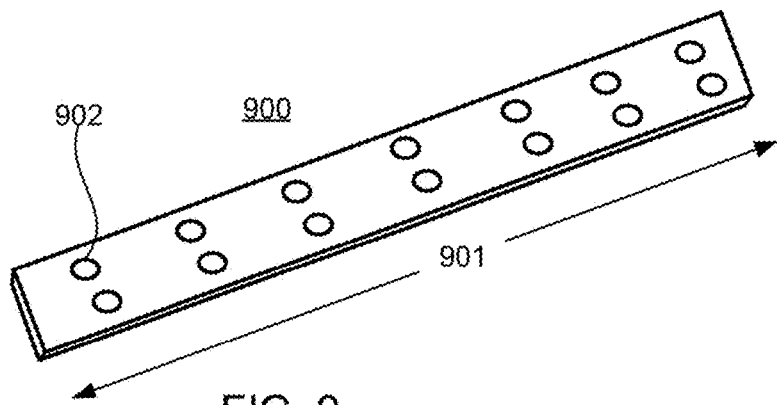
FIG. 9 shows a perspective view of an illustrative spine, in accordance with some embodiments of the present disclosure.

FIG. 9 shows a perspective view of illustrative spine 900, in accordance with some embodiments of the present disclosure. Spine 900 is configured to locate, arrange, maintain, align, or otherwise affect an axial stack of hoops of a stator. Spine 900 includes a length 901 that is configured to axially span one or more hoops of a stator. Spine 900 may be configured to provide axial stiffness, azimuthal stiffness, lateral stiffness (e.g., radial), or a combination thereof to a stack of hoops. A stator may include any suitable number of spines, having any suitable shape. For example, although illustrated as rectangular, a spine may be curved (e.g., to follow an azimuthal arc), segmented, bent, defined by a regular or irregular shape in a plane, or any other suitable shape. In some embodiments, as illustrated, spine 900 includes features 902 for affixing or otherwise coupling to hoops of a stator. Features 902 may include, for example, holes, slots, recesses, bosses, teeth, pins, threaded fasteners (e.g., threaded studs), any other suitable features, or any combination thereof to locate and maintain arrangement of hoops. One or more spines, each similar to spine 900, may be included in a stator (e.g., stator 400 of FIG. 4), to provide structural support, alignment, or both for the stator and components thereof. In some embodiments, spine 900 spans the length of a single hoop and is attached to other spines in an axial direction such that, when axially stacked, collective span the length of the stator. In some embodiments, spine 900 spans the length of multiple hoops and is attached to other similar spines in an axial direction such that, when stacked axially, collectively span the length of the stator. In some embodiments, spines help define the stator bore by aligning the stator teeth that are included in the hoop-teeth assemblies. Further, spines provide stiffness against twisting or other displacement of stator teeth, and thus potentially the stator bore, during operation.

Figure 10:
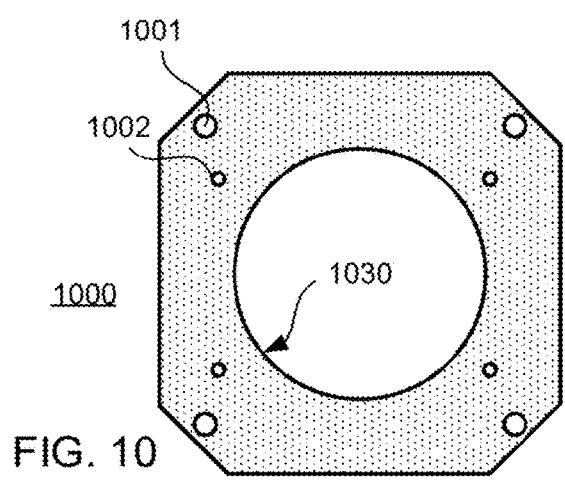
FIG. 10 shows a perspective view of an illustrative end plate, in accordance with some embodiments of the present disclosure.

FIG. 10 shows a perspective view of illustrative end plate 1000, in accordance with some embodiments of the present disclosure. End plate 1000 is configured to define the axial extent of the hoop stack. For example, end plate 1000 may be similar to hoop 500, but without a corresponding coil or stator teeth. In a further example, end plate 1000 may be similar to hoop 500 including a corresponding coil or stator teeth. In a further example, end plate 1000 need not be similar to hoop 500, and may, but need not, include corresponding coil(s) or stator teeth. In some embodiments, end plate 1000 is identical to a hoop (e.g., the terminal hoop at either axial end of the stator serves as the end plate, without a separate component needed). In some embodiments, end plate 1000 may be affixed to, or otherwise coupled to, one or more spines (e.g., similar to spine 900 of FIG. 9). For example, features 901 may include holes, slots, recesses, bosses, teeth, pins, threaded fasteners (e.g., threaded studs), any other suitable features, or any combination thereof to interface to one or more spines. In some embodiments, end plate 1000 is structurally stiffer than each hoop of the stack, to provide structural rigidity to the assembled stator. End plate 1000 includes end plate bore 1030, which is larger than the stator bore. End plate bore 1030 allows a translator to move axially without impeding the translator's motion. In some embodiments, one or two end plates, each similar to end plate 1000, may be included in a stator (e.g., stator 400 of FIG. 4), arranged at longitudinal ends of the stator. For example, an end plate may be included at each longitudinal end of the stator (e.g., two end plates are included). In some embodiments, in addition to capping the ends of the stator, end plates 1000 may be used in intermediate locations within the stator to provide additional structural support to the stator stack. In some embodiments, end plates 1000 may be used to directly attach the bearings to the stator. In some embodiments, one or more end plates may be arranged within a hoop stack (e.g., between two hoop-teeth assemblies). An end plate can be of any suitable design configured to help hold the hoops together. A spine can be of any suitable design configured to help hold the hoops together. In some embodiments, a stator need not include a spine, an end plate, or both. In some embodiments, end plate 1000 includes features 1001 for interfacing with and engaging spines. In some embodiments, end plate 1000 includes features 1002 for interfacing with and engaging tie-rods.

Figure 33:
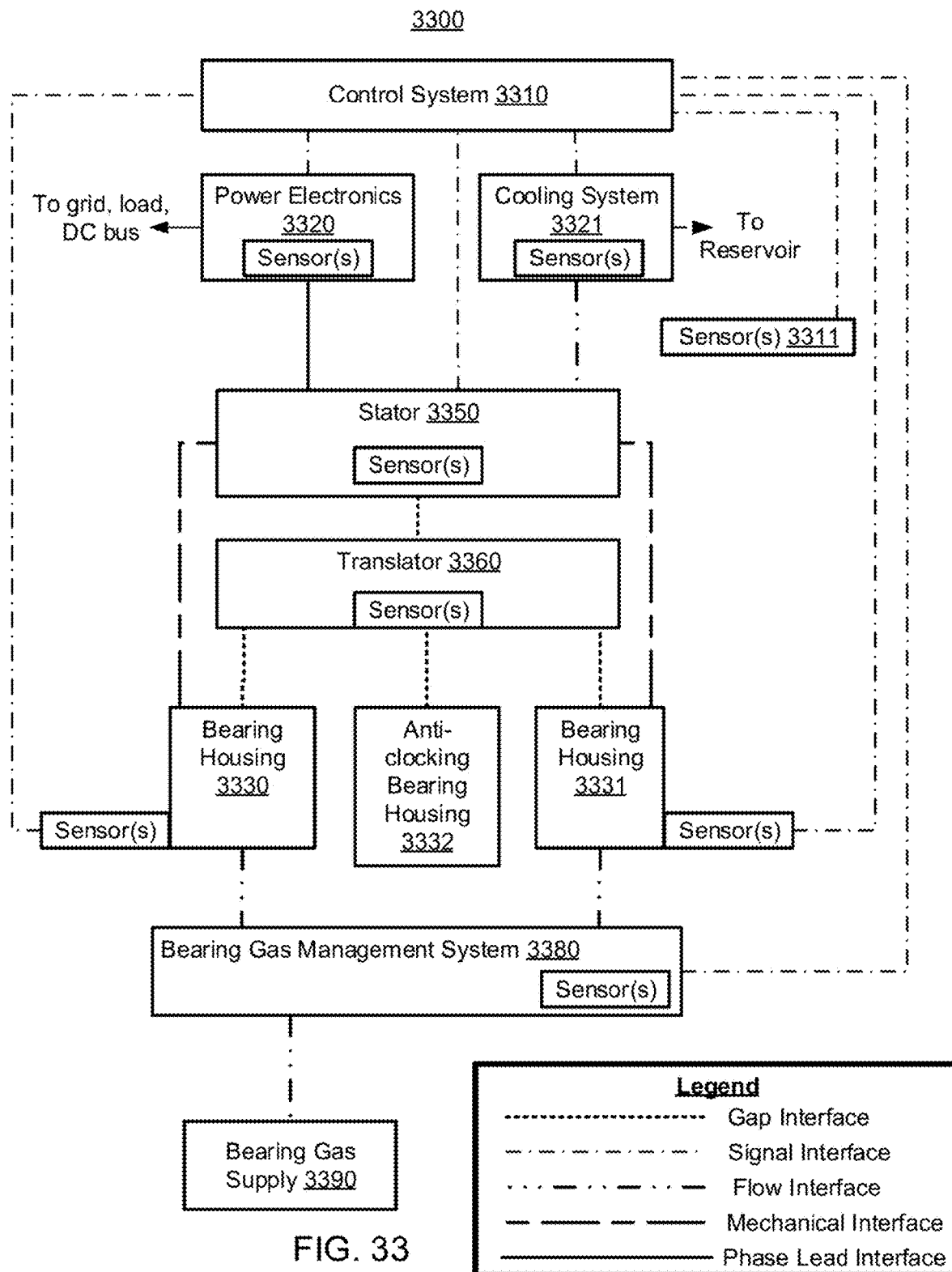
FIG. 33 shows a block diagram of an illustrative LEM system, in accordance with some embodiments of the present disclosure.
Figure 34:
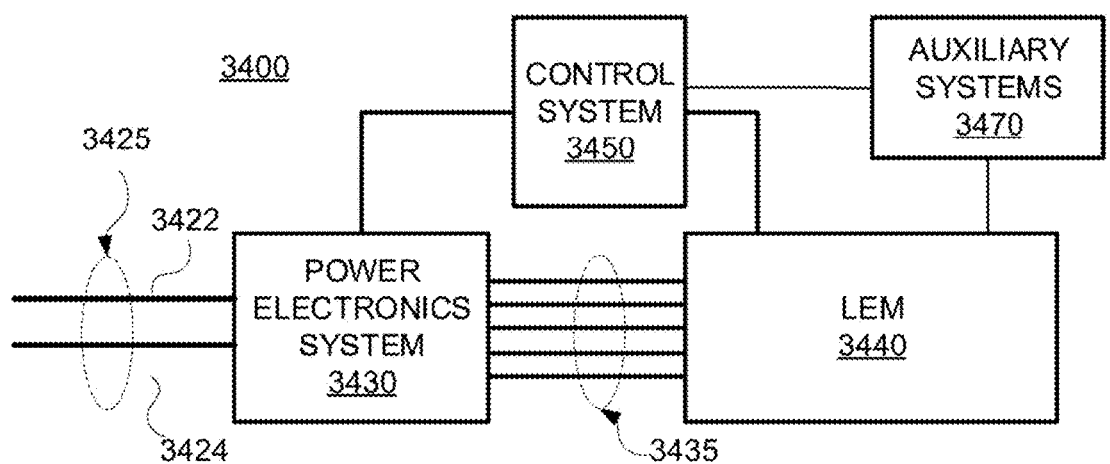
FIG. 34 shows a diagram of an illustrative system, in accordance with some embodiments of the present disclosure.

FIG. 11 shows a perspective view of illustrative assembly 1100 including end plate 1101, one hoop-teeth assembly and one coil (collectively hoop-coil assembly 1102, or "hoop-coil"), and spines 1103 and 1104, in accordance with some embodiments of the present disclosure. Spines 1103 and 1104 are coupled to end plate 1101, which defines a first axial side of a stator. Hoop-coil assembly 1102 includes a hoop, set of stator teeth 1105, and one or more coils 1106, and is arranged axially in-line with end plate 1101 (e.g., along an axis of the stator). In some embodiments, assembly 1100 is a first building block for a completed stator. FIG. 12 shows a perspective view of illustrative assembly 1200 including end plate 1101, several hoop-coil assemblies 1202 (e.g., including hoop-coil assembly 1102), and spines 1103 and 1104, in accordance with some embodiments of the present disclosure. Assembly 1200 is a partially assembled stator. Hoop-coil assemblies 1202 are stacked along the axis of the stator. In some embodiments, leads 1213 of hoop-coil assemblies 1202 are directed in the same orientation, although they need not be. In some embodiments, assembly 1200 is a prerequisite for a completed stator (e.g., stator 1300 of FIG. 13). FIG. 13 shows a perspective view of illustrative assembled stator 1300, including end plates 1101 and 1301, hoop-coils 1302 (e.g., including hoop-coil assemblies 1202), and spines 1103 and 1104, in accordance with some embodiments of the present disclosure. Hoop-coil assemblies 1302 are stacked along the axis of stator 1300, thus defining a stator bore (e.g., stator teeth 1305 define the stator bore). For example, the stator bore along with a magnet section of a translator define the motor air gap. In some embodiments, leads 1313 of hoop-coil assemblies 1302 are directed in the same orientation, although they need not be. In some embodiments, leads 1313 are coupled to power electronics (e.g., as illustrated in FIGS. 33, 34, and 36) configured to control current in one or more of leads 1313 (e.g., that may correspond to phases). In some embodiments, some of leads 1313 are coupled to power electronics and some of leads 1313 are coupled to other leads (e.g., to arrange coils in series or parallel, or to form a neutral wye or star node). In some embodiments, one or more of hoop-coil assemblies 1302 is affixed to spines 1103 and 1104 (e.g., by fastening, crimping, interlocking, pressing, tooth-groove interfaces, pinned, or otherwise located and constrained). In some embodiments, spines 1103 and 1104 provide lateral alignment (e.g., to ensure a substantially straight stator bore) for hoop-coil assemblies 1302. Stator 1300 includes four spines as illustrated (e.g., spine 1103, 1104, 1304 and 1306), but a stator may include any suitable of spines. In some embodiments, the axial length, number of phases, or both may be selected by forming longer stacks (e.g., using longer or shorter spines, using offset spines, and more or less hoop-coils in the stack). In some embodiments, optional tie-rods 1351 may be included to provide axial compression. In some embodiments, the hoop-coil assemblies are stacked such that adjacent hoop-coil assemblies interface or engage at their respective stator teeth interfaces such that the stator teeth bear any compressive loads in the axial direction, while, optionally, the hoops and spines maintain alignment.

In an illustrative example, end plates 1101 and 1301 may be configured to interface with bearing mounts, flexures, or bearing housings configured to constrain lateral (e.g., radial) displacement of a translator that is configured to interact electromagnetically with stator 1300. In some embodiments, the hoop-coil assemblies adjacent to end plates need not have a coil at the axially outer end (e.g., between the hoop-coil assembly and the end plate). For example, each hoop-coil assembly of a stack may include two coils, one on each axial end of the stator teeth, except for the first and last hoop-coil which only include coils on the axially inside end (e.g., away from the end plate). In some embodiments, each hoop-coil assembly of a stack may include two coils, one on each axial end of the stator teeth, including the first and last hoop-coil assembly (e.g., the hoop-coil assemblies adjacent the end plates).

Figure 14:
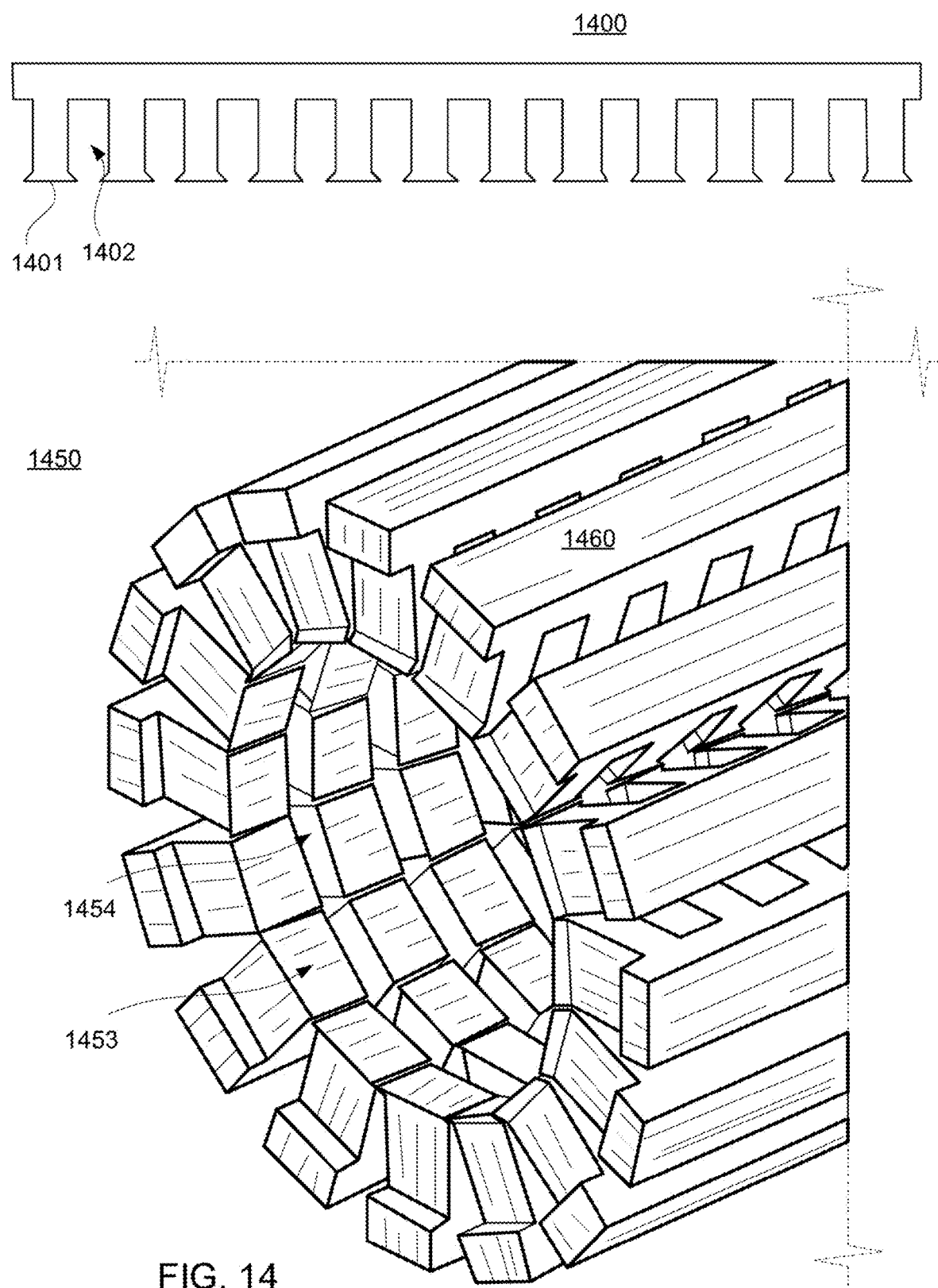
FIG. 14 shows a side view of an illustrative axial lamination and a perspective view of an illustrate set of axial lamination stacks, in accordance with some embodiments of the present disclosure.

FIG. 14 shows a side view of illustrative axial lamination 1400 and a perspective view of illustrate set of axial lamination stacks 1450, in accordance with some embodiments of the present disclosure. Axial lamination 1400 includes a plurality of teeth (e.g., including tooth 1401), separated by a plurality of slots (e.g., slot 1402). Lamination stacks 1450 (e.g., including lamination stack 1460), as illustrated, include a set of lamination stacks (each stack include a plurality of laminations similar to lamination 1400) arranged to form stator bore 1453. The set of stator teeth of lamination stacks 1450 define stator bore 1453. Slots 1454 extend at least partially azimuthally around stator bore 1453, arranged in between axially consecutive rows of stator teeth. In some embodiments, wire may be wound in slots 1454 to form windings. In some embodiments, coils may be installed in slots 1454, with phase leads routed in any suitable way. In some embodiments, the lamination stacks of the set of lamination stacks have an axial length equal to or shorter than the length of the stator. In some embodiments, lamination stacks 1450 are arranged using structural and alignment fixtures, features, components, or any combination therein. For example, lamination stacks 1450 could be structurally supported and aligned at least one hoop (e.g., similar to hoop 353 in FIG. 3), spine (e.g., spine 352 in FIG. 3), end plate (e.g., end plate 354 in FIG. 3), tie rods (e.g., tie rods 359 in FIG. 3), or any combination thereof.

Figure 15:
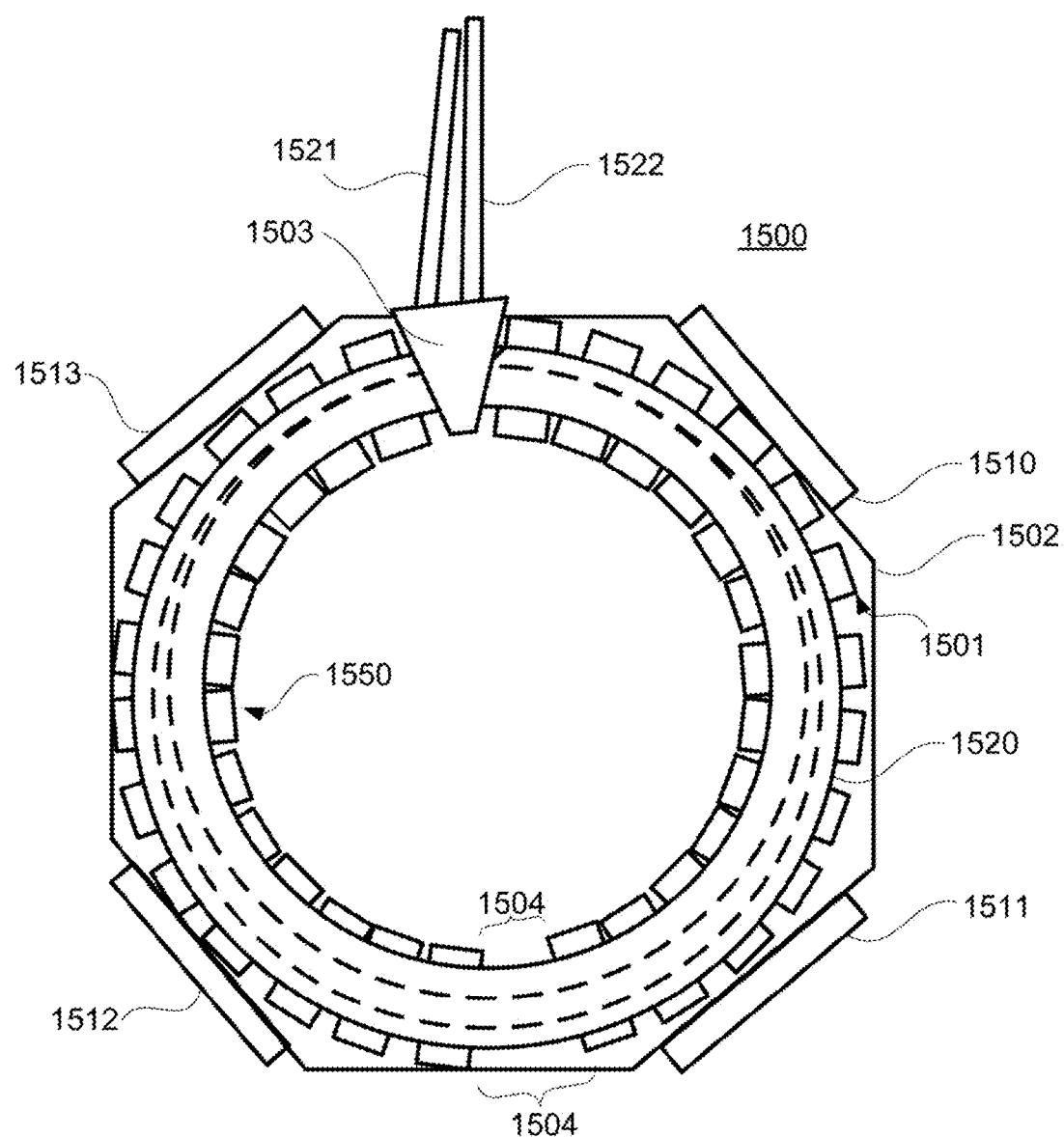
FIG. 15 shows a face view of an illustrative hoop-coil, with lead management and an azimuthal gap, and spines, in accordance with some embodiments of the present disclosure.

FIG. 15 shows a face view of illustrative hoop-coil 1500, with lead management cover (e.g., using cover 1503), azimuthal gap 1504, and spines 1510-1513, in accordance with some embodiments of the present disclosure. Hoop-coil assembly 1500 includes hoop 1502, set of stator teeth 1501, a coil (e.g., including winding 1520 and leads 1521 and 1522), and cover 1503. In some embodiments, as illustrated, azimuthal gap 1504 is included among set of stator teeth 1501 to affect an anti-clocking force on a translator configured to interact electromagnetically with a stator that includes hoop-coil assembly 1500. Hoop 1502 is coupled to, or otherwise constrained from lateral motion (e.g., radial, azimuthal, or otherwise) by, spines 1510, 1511, 1512, and 1513. Cover 1503, which may but need not extend axially and radially across hoop-coil 1502, is configured to protect and guide leads 1521 and 1522 away from winding 1520 to power electronics, leads of other windings, a neutral wye/star node, or any other suitable electrical terminal. In some embodiments, the presence of cover 1503 causes a second azimuthal gap among set of stator teeth 1501 In some embodiments, azimuthal gaps (e.g., azimuthal gap 1504 and azimuthal gap for cover 1503) may be located at any suitable azimuthal location (e.g., substantially 180 degrees apart), may have any suitable size (e.g., substantially the same size), or both. In some embodiments, one or more azimuthal gap between stator teeth of a hoop-coil assembly may be configured to affect an anti-clocking force on a translator configured to interact electromagnetically with a stator that includes the hoop-coil assembly. FIG. 7, as illustrated, shows uniform azimuthal gaps between stator teeth for the teeth between the azimuthal gap 1504 and the azimuthal gap for cover 1503, however, this need not be the case. Stator teeth can be arranged in a hoop-coil assembly with any suitable number of azimuthal gaps with any suitable sizes. In some embodiments, a hoop-coil assembly may include two coils per hoop (e.g., on opposite axial sides of set of stator teeth), although any suitable number of coils may be included in a hoop-coil (e.g., one or more coils). In some embodiments, the stator laminate tooth pitch (also referred to as the stator slot pitch) may vary from one hoop-coil assembly to another hoop-coil assembly based on their axial location within a stator stack. In some embodiments, if the velocity profile of a translator is the highest at the midpoint of a stroke (e.g., the center of a stator), a longer stator slot pitch in the middle of the stator may be desired because it could lower the phase frequency and the concomitant core losses. Similarly, if the velocity profile of a translator is the lowest near the end of a stroke (e.g., the ends of a stator), a shorter stator slot pitch at the ends of the stator may be desired because they would increase the phase frequency, or EMF-per-turn, thereby allowing a greater contribution of work (i.e., force over a distance) from the end windings. In some embodiments, the hoop-coil assemblies located at the end sections of the stator may include a shorter stator slot pitch as compared to the stator slot pitch of hoop-coil assemblies in the center section of the stator.

As illustrated in FIGS. 11-13, a plurality of hoops with corresponding coils and stator teeth (e.g., a plurality of hoop-coil assemblies 1500 of FIG. 15) may be stacked axially to form a stator. For example, the plurality of hoops with corresponding coils may be stacked along one or more spines (e.g., spines 1510-1513) for alignment, securement, or both. In some embodiments, the number of turns of winding comprising the coil is the same for each hoop-coil assembly. In some embodiments, the number of turns of winding comprising the coil may vary between hoop-coil assemblies. For example, in some embodiments, a hoop-coil assembly located towards an end of a stator may include a coil with fewer winding turns, a hoop-coil assembly located towards the center of a stator may include a coil with more winding turns, or both, or vise-versa.

In some embodiments, a stator need not include separate spines. For example, in some embodiments, a plurality of hoop-coils may be stacked axially, optionally aligned around a central mandrel (e.g., as a proxy for a magnet section plus motor air gap), and then welded or bonded to each other. In a further example, the hoop-coils may be placed into compression by axially preloading (e.g., with tie-rods to put the stack in compression) and then wielding, axially preloading then clamping, or both. In some embodiments, a plurality of hoop-coils may be stacked axially, and placed in compression axially using one or more tie rods that extend through the stack of hoops. For example, in some embodiments, tie-rods may be used in addition to, or instead of, spines and end plates. In some embodiments, each of the axially stacked hoops interface with the spines, and tie-rods are used to place the axial stack of hoop-coil assemblies in axial compression.

In some embodiments, the components of the present disclosure are configured (e.g., in order to keep manufacturing costs low) to leverage existing motor manufacturing infrastructure (e.g. presses, dies, coil machines, insulation systems), make efficient use of lamination sheet material, provide compatibility with automated assembly and validation methods, allow streamlined hand-assembly, and provide sufficient cooling options in order to achieve high power density and low material and assembly cost.

In an illustrative example, exposed stator teeth (e.g., metal) and windings (e.g., copper wire or aluminum wire) around the radial outside of the stacked assembly (i.e., the stator) provide access for either passive or active motor cooling, in order to control temperatures and improve motor life (e.g., under large current loads), motor efficiency, motor power, or any combination thereof. In some embodiments, a shroud (e.g., shown in FIG. 4) may be installed in order to more effectively direct cooling air into the magnet air gap between windings, between stator teeth, or a combination thereof.

The translating assembly or "translator" electromagnetically interacts with a stator to convert between electric energy and kinetic energy. Accordingly, the translator is capable of moving under electromagnetic forces, moving under any forces applied to the translator, generating an electromotive force (emf) in phases of the stator (e.g., and conversely react to an emf generated by the stator), achieving a nominally linear path of movement, and withstanding thermal and mechanical loadings experienced during operation (e.g., cycles).

Figure 16:
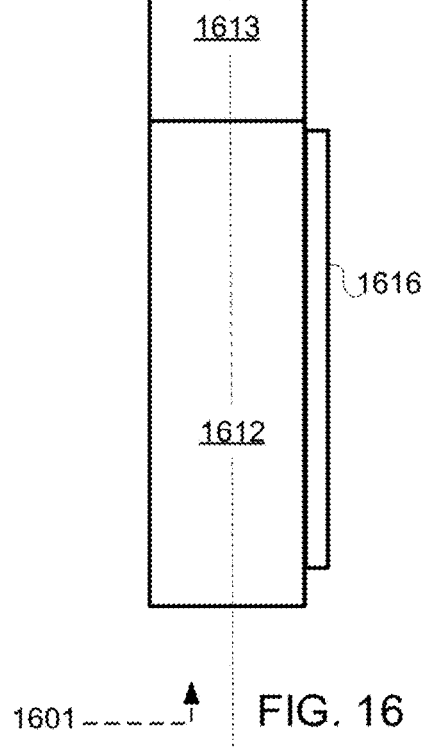
FIG. 16 shows a side view of an illustrative translator, in accordance with some embodiments of the present disclosure.
Figure 17:
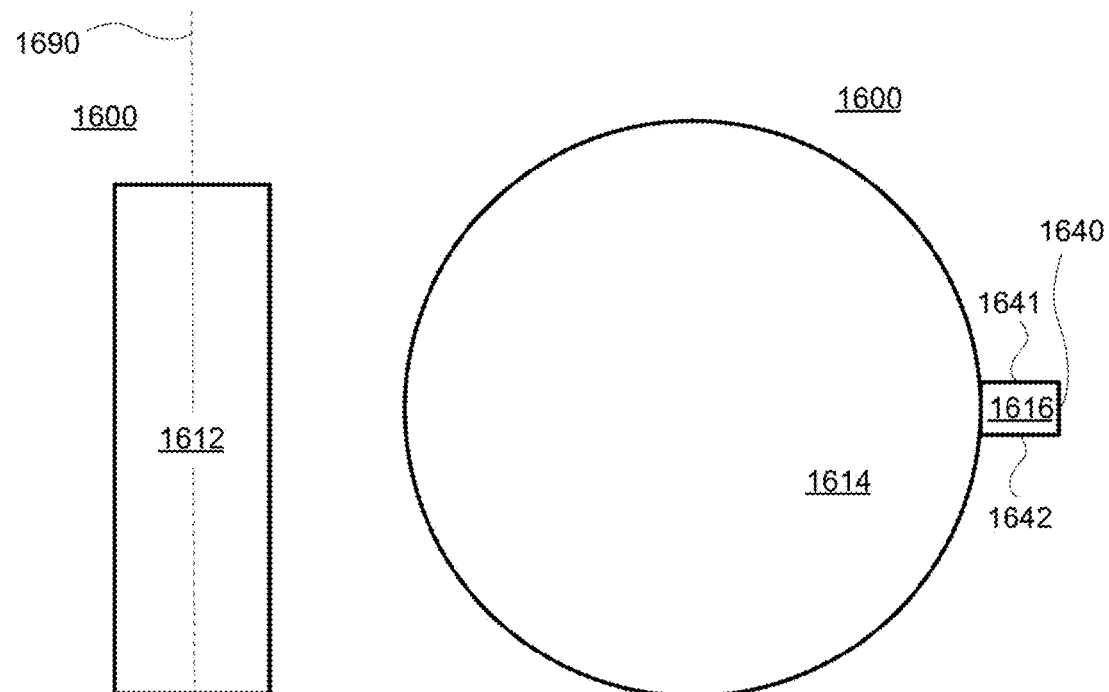
FIG. 17 shows an axial end view of the translator of FIG. 16, in accordance with some embodiments of the present disclosure.

FIG. 16 shows a side view of illustrative translator 1600, in accordance with some embodiments of the present disclosure. FIG. 17 shows an axial end view of translator 1600, in accordance with some embodiments of the present disclosure. The axial end view of FIG. 16 is taken from direction 1601. Translator 1600 includes tube 1612. Translator 1600 includes section 1613, which may include features (e.g., magnets) for enabling a desired electromagnetic interaction with a stator. Translator 1600 also optionally includes rail 1616 configured to provide a position index, an anti-clocking bearing surface, or both. In some embodiments, translator 1600 does not include rails, and sufficient anti-clocking stiffness in the azimuthal direction is provided through the electromagnetic interaction between the translator and stator (e.g., a stator having azimuthal gaps between stator teeth). In some embodiments, translator 1600, or components thereof, may be symmetrical about axis 1690 (e.g., including circular shapes centered at axis 1690, fastener patterns, arrangement of rails, and other aspects having rotational symmetry). In some embodiments, translator 1600, or components thereof, need not be symmetrical about axis 1690. In some embodiments, section 1613 may have substantially the same diameter as tube 1612. In some embodiments, section 1613 may have a diameter smaller or larger than tube 1612. In some embodiments, the outer dimensions of section 1613, tube 1612, or both, may be uniform, nonuniform, or both in the axial direction. For example, tube 1612 may include a taper, step, or both. In a further example, section 1613 may have a larger diameter at or near its axial center. In some embodiments, the translator 1600 may comprise of several sections made of different materials. In some embodiments, material composition of section of the translator 1600 may be optimized for desired properties such as weight, mechanical strength and electrical or thermal properties.

Rail 1616 includes, for example, surface 1640, which may include a feature for position indication or indexing; surface 1641, which may include an anti-clocking bearing surface; and surface 1642, which may include an anti-clocking bearing surface. In some embodiments, a translator may include zero, one, two, or more than two rails, having any suitable azimuthal or axial positioning on a translator, in accordance with the present disclosure. For example, in some embodiments, a translator may include more than one rail to provide multiple position indications (e.g., for redundancy, accuracy, symmetry, or a combination thereof). In some embodiments, translator 1600 need not include any anti-clocking rails. In some embodiments, magnetic interactions between the translator and the stator may provide adequate anti-clocking stiffness in the azimuthal direction. In some embodiments, without anti-clocking rail 1616, for example, position indexing features may be attached directly to translator 1600, integrated directly in translator 1600, or both (e.g., attached directly to tub 1612, integrated directly in tube 1612, or both). In some embodiments, surfaces 1641 and 1642 are configured to interface with corresponding anti-clocking bearings (e.g., which may include anti-clocking gas bearings). Anti-clocking bearings provide stiffness in the azimuthal direction, thus preventing or reducing azimuthal motion of the translator. In some embodiments, surface 1640 may include machined features for position indication or indexing, magnetic tape for position indication or indexing, any other suitable feature for position indication or indexing, or any combination thereof. In some embodiments, sensing the position of the translator relative to the stator may be determined by sensing the position of one or more rows of magnetic features section 1613 of the translator in conjunction with or without the use of external position indexing features. For example, a back electromotive force (emf) may be measured in one or more phase windings to determine a relative position of the stator and translator. In a further example, a control signal (e.g., a pulse-width modulation signal for applying current), a measured current, or both may be used to determine a relative position of the stator and translator.

Figure 18:
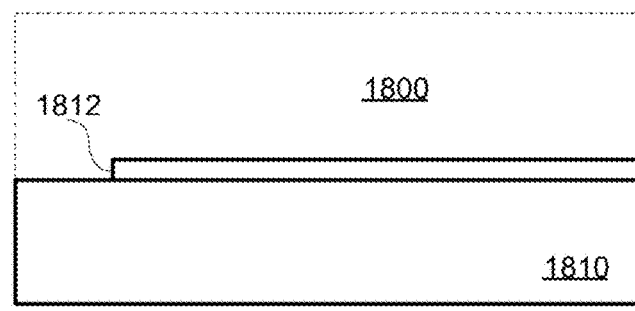
FIG. 18 shows a side cross-sectional view of an end of an illustrative translator tube and rail, in accordance with some embodiments of the present disclosure.

FIG. 18 shows a side cross-sectional view of an end of illustrative translator tube 1810, and rail 1812, in accordance with some embodiments of the present disclosure. For example, rails may be configured to constrain rotational motion of the translator and/or to mount an encoder tape for position measurement. In some embodiments, the rail is affixed (e.g., bolted, welded, glued, taped, or any combination thereof) to the translator. Rail 1812 can be affixed to translator tube 1810 through any suitable means such as bolted, welded, glued, taped, or any combination thereof. In some embodiments, rail 1812 can be affixed to translator tube 1810 at any suitable location of the translator tube and at any suitable location of the rail. For example, and rail 1812 need not be affixed to the translator tube 1810 over the entire axial length of the rail (e.g., there can be portions of the rail that are not affixed to the translator tube).

Figure 19:
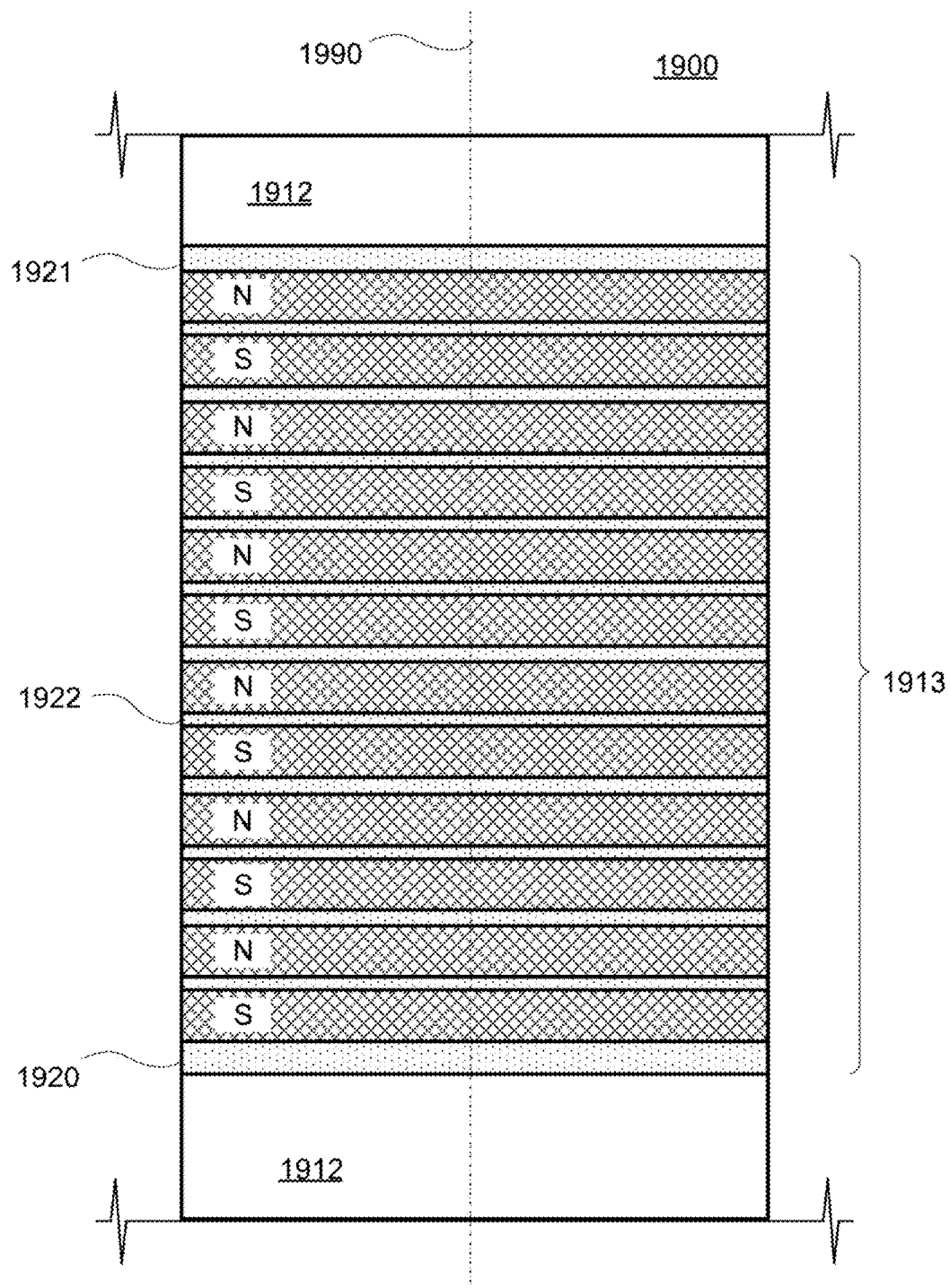
FIG. 19 shows a top view of a portion of an illustrative translator having a magnet section, in accordance with some embodiments of the present disclosure.
Figure 22:
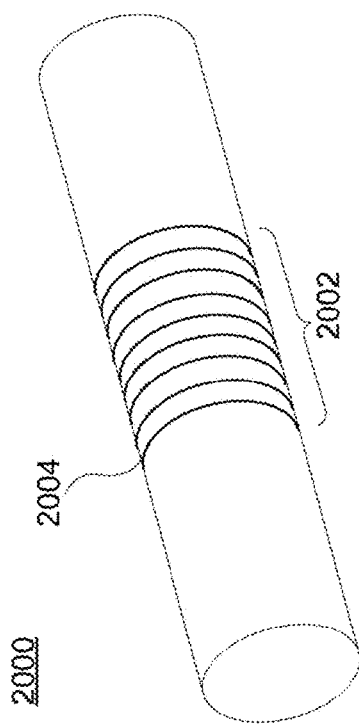
FIG. 22 shows a cross-sectional view of a portion of an illustrative magnet section, in accordance with some embodiments of the present disclosure.

FIG. 19 shows a side view of a portion of illustrative translator 1900 having magnet section 1913, in accordance with some embodiments of the present disclosure. Translator 1900 includes tube 1912 and magnet section 1913 (e.g., which may be similar to section 1613 of FIG. 16). A magnet section may include any suitable features that may interact electromagnetically with phases of a stator. For example, as illustrated, a magnet sections may include an array of (N)orth and (S)outh arranged magnets (e.g., with N or S poles facing outward as illustrated), a Halbach array, any other suitable magnetic array, or any combination thereof. In some embodiments, the axial lengths of N and S magnet rows may be substantially the same or substantially different. For example, magnet rows towards the axial ends of section 1913 may contribute less to the generation of magnetic field and may be shorter in axial length then magnet rows towards the axial center of section 1913 (e.g., as illustrated in FIG. 22). Magnet section 1913 includes optional end features 1920 and 1921, which serve to delineate magnet section 1913 and may function to help transfer force (e.g., axial force) exerted on translator 1900. Magnet section 1913 also includes optional locating features 1922, which are configured to locate rows of like-polarity arranged magnets. Locating features 1922 may be configured to locate magnets as rows, columns, a grid, or any other suitable arrangement having any suitable pole pitch. In some embodiments, a corresponding stator may include a suitable number of phases, having a suitable axial phase length in view of the pole pitch. Center axis 1990 is shown for reference. For example, magnet section 1913 may be symmetric, near symmetric, or otherwise have a symmetry about center axis 1990.

Figure 20:
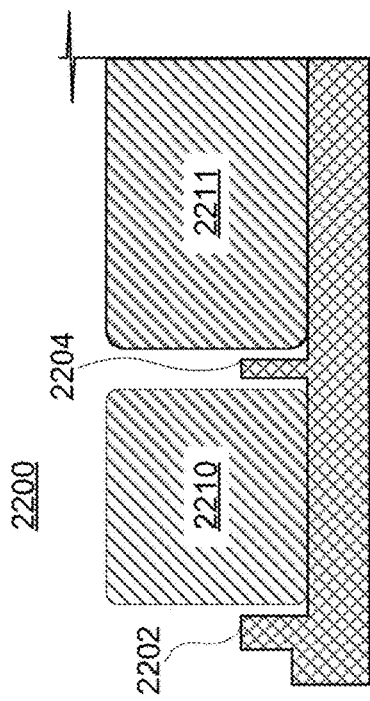
FIG. 20 shows a perspective view of a portion of an illustrative translator having features for arranging magnets, in accordance with some embodiments of the present disclosure.

FIG. 20 shows a perspective view of a portion of illustrative translator 2000 having features 2004 for arranging magnets (not shown in FIG. 20), in accordance with some embodiments of the present disclosure. Features 2004 are configured to aid in arranging magnets of section 2002. In some embodiments, as illustrated, features 2004 include raised ridges, configured to act as indexes for positioning magnets during assembly, operation, or both. Additionally, features 2004 (e.g., ridges) may provide resistance against axial acceleration and help keep the magnets in place. Additionally, in some embodiments, suitable adhesive may be used to bond the magnets to the translator. Features 2004 may be, but need not be evenly spaced. For example, features 2004 may be spaced axially to accommodate magnets of varying axial lengths (e.g., shorter magnets at the axial ends).

Figure 21:
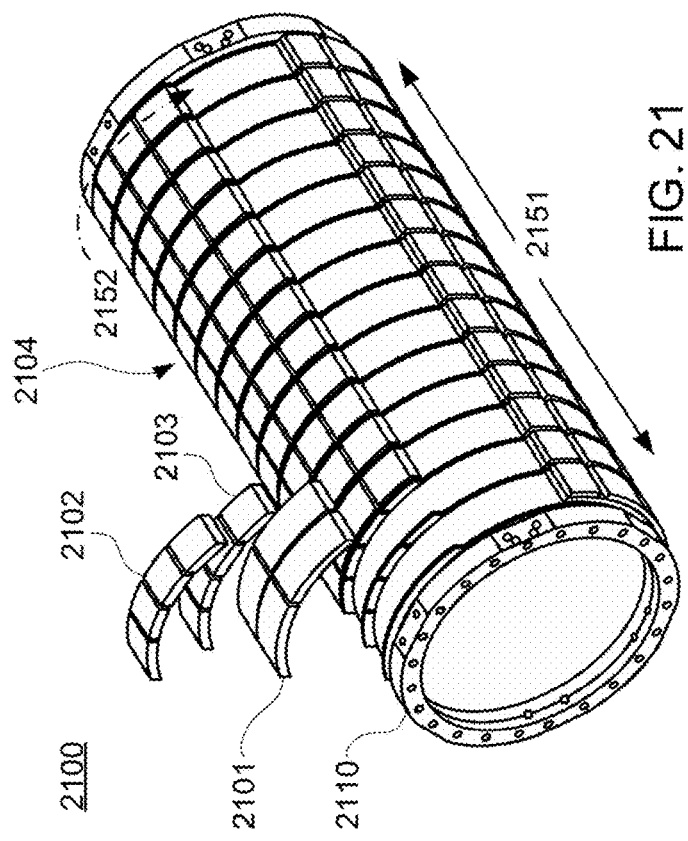
FIG. 21 shows a perspective view of a portion of an illustrative translator section having magnets arranged, in accordance with some embodiments of the present disclosure.

FIG. 21 shows a perspective view of a portion of illustrative translator section 2100 having magnets 2104 arranged, in accordance with some embodiments of the present disclosure. Translator section 2100 is shown with magnets 2102 and 2103 removed for clarity (e.g., an operable translator includes the magnets affixed to body 2110). Magnets 2104 are arranged into rows 2152 arranged at a particular axial position or position range and extending at least partially azimuthally around body 2110, and stacks 2151 arranged at a particular azimuthal position or position range and extending axially. For example, a row of rows 2152 may extend azimuthally around body 2110, while a stack of stacks 2151 may extend the full or near-full axial length of body 2110. In another example, a row of rows 2152 may partially extend azimuthally around body 2110, while a stack of stacks 2151 may extend the full or near-full axial length of body 2110. Magnets 2104 may be arranged in rows 2152 of alternating polar orientation (e.g., N and S). In some embodiments, all magnets in a row having the same polar orientation, while magnets along a stack have alternating polar orientation. In some embodiments, as illustrated, bondings 2101 are arranged radially underneath magnets 2104 to aid in affixing magnets 2104 to body 2110. Body 2110 may be constructed of any suitable material and may be configured to interface with one or more translator tubes (e.g., having bearing surfaces) to form a translator. For example, body 2110 may be comprised of a metal composite, which could reduce eddy losses in the translator. In some embodiments, a translator tubes are comprised of non-ferrous materials and body 2110 is comprised of a ferrous material in order to complete the magnetic circuit (e.g., in a Hallbach arrangement). In some embodiments, body 2110 may include bearing surfaces (e.g., body 2110 and magnets 2204 may form a translator without additional structural components). In some embodiments, magnets are press fit into the translator or section thereof (e.g., radially or axially pressed). For example, magnets may be arranged inside of a translator or section thereof (e.g., if press fit axially or 3-D printed) such that a layer of material (e.g., metal) exists between magnets and stator teeth.

Figure 23:
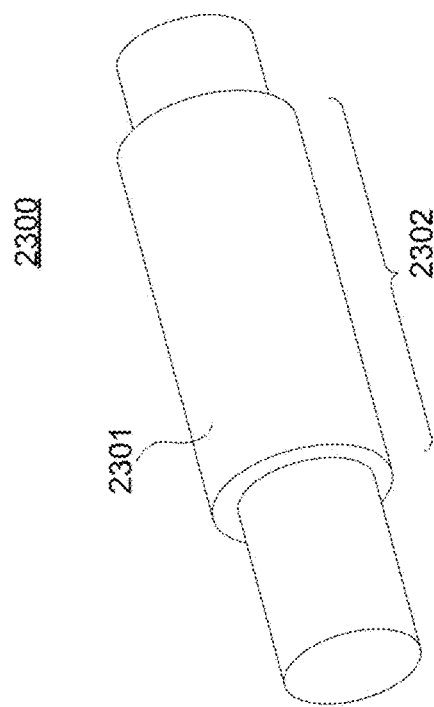
FIG. 23 shows a perspective view of an illustrative translator having a wrap, in accordance with some embodiments of the present disclosure.

FIG. 22 shows a cross-sectional view of a portion of illustrative magnet section 2200, in accordance with some embodiments of the present disclosure. In some embodiments, a translator assembly includes one or more end features 2202 to constrain the position/motion of magnets 2210 (e.g., resist acceleration of magnets). In some embodiments, a translator assembly includes one or more locating features 2204 to constrain the position/motion of magnets 2211 and 2210 (e.g., resist acceleration of magnets). In an illustrative example, features 2004 of FIG. 20 may include end features 2202, locating features 2204, or both. In some embodiments, magnets are bonded to a translator tube (e.g., using adhesive). In some embodiments, a magnet assembly is wrapped using a material (e.g., a material compliant with thermal expansion) to protect the magnets, as illustrated in FIG. 23. In some embodiments, features 2004 and end features 2202 are machine into or affixed to a body (e.g., similar to body 2110 in FIG. 21) that is affixed to one or more translator tubes (e.g., similar to the translator tube 1612 in FIG. 16).

FIG. 23 shows a perspective view of illustrative translator 2300 having wrap 2301, in accordance with some embodiments of the present disclosure. In some embodiments, section 2302 includes magnets arranged in an array (e.g., partially or fully extending around or axially along the translator tube). Optional wrap 2301 is included to apply a compressive force on the magnets (e.g., in the inward radial direction), protect the magnets from rubbing/collisions, prevent ejection of any of the magnets (e.g., in the event of a bonding failure), or a combination thereof. In some embodiments, optional wrap 2301 may be compliant with thermal expansion. In some embodiments, wrap 2301 may include, for example, a Kevlar-based material. For example, in some embodiments, wrap 2301 is applied by wrapping a sheet of Kevlar material around section 2302 in one or more layers (e.g., similar to a spool). A wrap may be applied to any suitable section such as, for example, section 1613 of FIG. 16, with any suitable axial length along a suitable section and with any suitable thickness.

While stator and magnet section design affect motor efficiency, bearing designs can affect the mechanical efficiency of the LEM, (e.g., the amount of power lost to bearing friction and windage during operation). For example, provided a streamlined cylindrical oscillator and modest peak surface speeds, windage losses can be minimized, and thus mechanical loss tends to be dominated by friction heating in the bearings, which support the oscillator shaft and magnet array (e.g., the translator). Some illustrative examples of linear contact bearing types include plane dry-film bearings, linear ball bearings, and oil-lubricated plane bearings. These solutions typically impose one or more constraints on a system such as, for example, a continuous lubrication requirements and/or short maintenance interval, an inability to handle high acceleration or velocity (e.g., without excessive wear or component damage), short replacement intervals and part life, high friction losses, or a combination thereof. The machines and systems of the present disclosure may include contact bearings, non-contact bearings, or both.

In some embodiments, the present disclosure describes self-aligning aerostatic bearings (e.g., referred to herein as air bearings or gas bearings). Gas bearings may be useful for applications that require high velocities (e.g., >2, >5, >10, >15 m/s), high mechanical efficiency (e.g., low friction losses), long maintenance intervals, and high durability. Gas bearings operate by flooding a small gap (e.g., a gap at a bearing interface) with pressurized air or other gas via orifices, porous media, any other suitable flow restriction, or a combination thereof. As the surface of the translator moves laterally (e.g., radially) closer to the fixed bearing surface (i.e., the air gap lessens), the bearing gas flow restriction tightens, and the pressure in the bearing gap increases. The pressure provides a restoring force to prevent, or limit instances and severity of, the translator surface contacting the bearing surface of the bearing housing. In some embodiments, the gas bearings of the present disclosure consume a modest amount of pressurized gas, and as long as, for example, the feed air is filtered, and the load capacity of the bearing is not exceeded, the gas bearings may have a long operating life, even at very high reversing accelerations, while minimizing or eliminating friction losses relative to contact bearings or hydrodynamic bearings.

Figure 24:
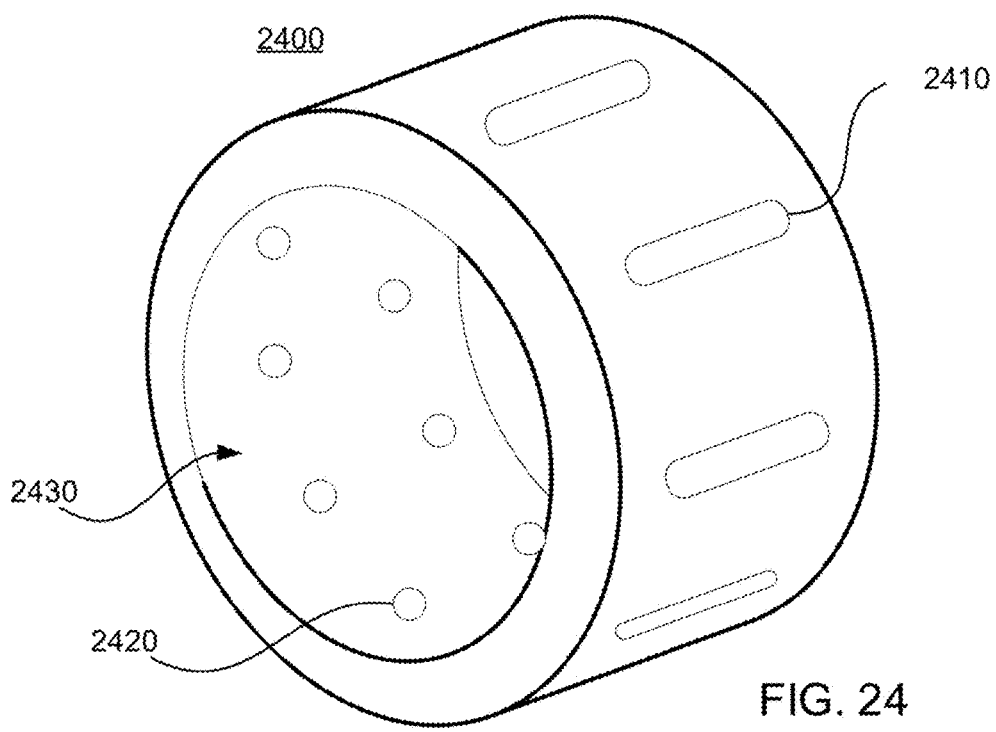
FIG. 24 shows a perspective view of an illustrative bearing housing, in accordance with some embodiments of the present disclosure.

FIG. 24 shows a perspective view of illustrative bearing housing 2400, in accordance with some embodiments of the present disclosure. As illustrated, bearing housing 2400 is configured to extend azimuthally around a translator having a circular bearing surface. In some embodiments, bearing housing 2400 may include one or more azimuthal, radial, or axial pieces that may be assembled to form a complete bearing housing. As illustrated, bearing housing 2400 is configured to accommodate a gas bearing, and includes passages 2410 and flow restrictions 2420. Passages 2410 direct and distribute flow of bearing gas within bearing housing 2400 to flow restrictions 2420. Passages 2410 may include, for example, plenums, channels, manifolds, filters, drilled holes, machines recesses, flow control features, ports for sensor (e.g., to sense bearing gas pressure, flow or temperature), ports for receiving a supply of bearing gas, ports for removing condensate (e.g., condensed water, oil, or other condensed fluids), any other suitable features, or any combination thereof. Flow restrictions 2420 are configured to provide the bearing gas to the bearing interface (e.g., a bearing gap) at bearing bore 2430. Flow restrictions 2420 provide bearing gas at a desired pressure and flow rate to the gas bearing, which provides lateral stiffness to off-axis motion of the translator. Flow restriction 2420 may include, for example, orifices, porous sections, or both, or any other suitable flow-restricting features. For example, in some embodiments, flow restrictions 2420 include an array of orifices along bearing bore 2430. In some embodiments, flow restrictions 2420 includes a thickness of porous material along bearing bore 2430. In some embodiments, bearing housing 2400 may include a coating, a consumable layer, a dry film lubricant, an abradable coating, or a combination thereof, at bearing bore 2430 to accommodate, for example, contact with a translator.

Although bearing housing 2400 is shown in FIG. 24 as having a cylindrical bearing bore 2430, a bearing housing may include any suitable surface for creating a bearing interface. For example, a bearing housing may include a semi-circular surface, a flat surface, a non-circular curved surface, a piecewise flat or curved surface, any other suitable continuous, piecewise, or segmented surface, or any combination thereof. For example, a bearing housing may include more than one cylindrical surfaces, separated axially, for forming respective bearing interfaces. In a further example, a LEM may include, at a particular axial region, a set of three, four, or more bearing housings having flat surfaces and forming respective bearing interfaces with corresponding flat surfaces of a translator (e.g., a translator having a triangular, rectangular, or other polygonal cross-section). In some embodiments, a bearing housing need not include passages 2410 or flow restrictions 2420. For example, a bearing housing may be configured as a contact slide bearing, with a low-friction coating applied at bearing bore 2430.

Figure 25:
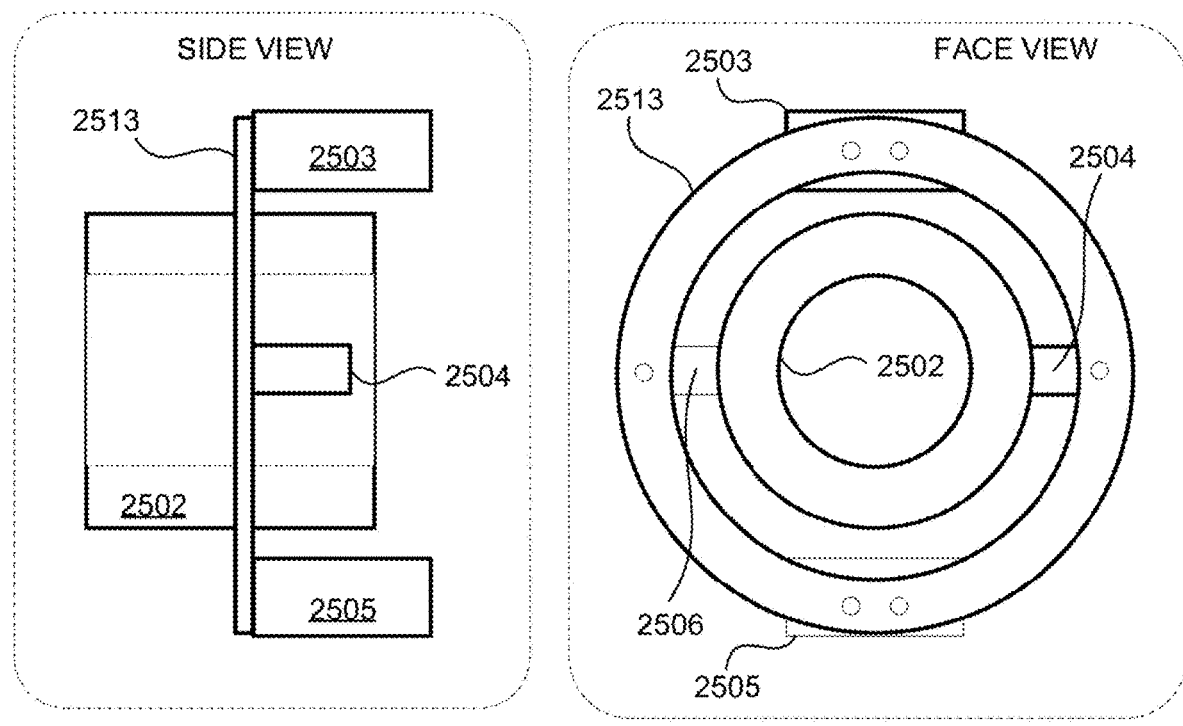
FIG. 25 shows a side view and a face view of a portion of an illustrative assembly including a bearing housing, a bearing mount, a flexure, and flexure mounts, in accordance with some embodiments of the present disclosure.

FIG. 25 shows side view and axial view of a portion of an illustrative assembly including bearing housing 2502, bearing mounts 2503 and 2505, flexure 2513, and flexure mounts 2504 and 2506, in accordance with some embodiments of the present disclosure. Flexure 2513 is affixed to bearing mounts 2503 and 2505, and also affixed to flexure mounts 2504 and 2506. Flexure mounts 2504 and 2506 are affixed to bearing housing 2502. Bearing mounts 2503 and 2505 may be affixed to a stator, a frame system (e.g., a frame member or bulkhead), a cylinder, any other suitable component that is substantially stationary relative to the translator, or any combination thereof. As illustrated, flexure 2513 is relatively stiff against lateral displacement of bearing housing 2502 (e.g., to maintain lateral alignment), and is relatively less stiff to pitch and yaw of bearing housing 2502 (e.g., to accommodate perturbations during operation, minor misalignments, or asymmetries of the translator tube). For example, the assembly of FIG. 25 may allow a translator to continue low-friction operation in the event of (e.g., thermal distortion, force-based distortion) that may cause bending of the translator or other components.

The aligning feature may include a self-aligning flexure (e.g., a ring flexure, a spherical flexure), joint (e.g., a spherical joint, a Heim joint), or both, which allows the bearing housings to self-align to the translator tube (e.g., by pitch, yaw, or other non-azimuthal rotation), thus reducing the precision of tolerances required of the components at the bearing interface. In some embodiments, the self-aligning feature is integrated into or is a part of the bearing (e.g., a spherical bearing). A flexure is particularly helpful with cylindrical gas bearings, because of their tight clearances and relative inability to apply moments. It will be understood that the present disclosure does not require that the bearing housings be mounted via self-aligning mounts, and any suitable mount may be used to couple a bearing housing to a stationary component (e.g., a stator). In some embodiments, flexure 2513 allows self-aligning of bearing housing 2502 to the translator (e.g., to counteract translator asymmetries or deformation) while keeping the electromagnetic section substantially centered in the stator (e.g., a more uniform motor air gap).

In some embodiments, bearing housings (e.g., bearing housing 2502) and may be arranged such that at least a portion of a magnet section (e.g., section 1613 of FIG. 16) may axially travel beyond the axial length of a stator (e.g., stator 350 of FIG. 3), beyond the axial length of a hoop stack of a stator (e.g., hoop stack 351 of FIG. 3), or both. For example, bearing housings may be affixed to a stator (e.g., via bearing mounts 2503 and 2505) at a sufficient distance from the stator to allow a magnet section to axially travel beyond the stator (or hoop stack therein) such that at least a portion of the magnet section (and magnets thereof) is not electromagnetically interacting with the stator (or hoop stack therein). This type of configuration and LEM operation may be advantageous for efficiency, power, costs, manufacturing, or maintenance purposes, or any other suitable purpose, or any combination thereof. In some embodiments, the bearing housings may be arranged such that at least a portion of a magnet section (e.g., section 1613 of FIG. 6) may not axially travel beyond the axial length of a stator (e.g., stator 350 of FIG. 3), beyond the axial length of a hoop stack of a stator (e.g., hoop stack 351 of FIG. 3), or both.

Figure 26:
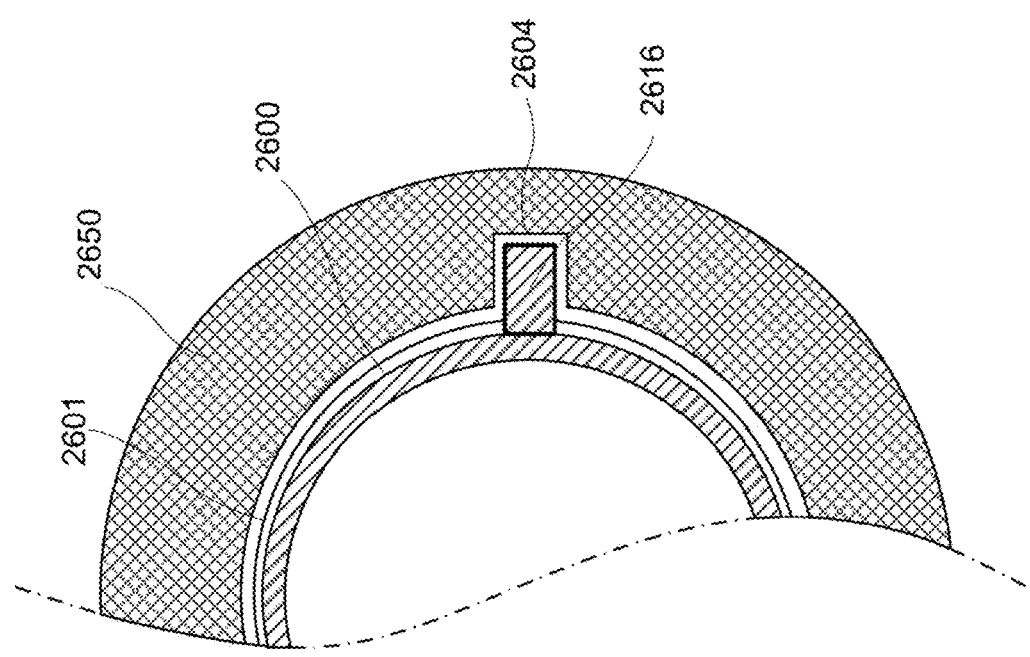
FIG. 26 shows a cut-away cross-sectional view of an illustrative translator and stator, in accordance with some embodiments of the present disclosure.

FIG. 26 shows a cut-away cross-sectional view of translator 2600 and stator 2650, in accordance with some embodiments of the present disclosure. In some embodiments, stator 2650 may include relief 2604 to accommodate rail 2616 during axial motion of translator 2600 (e.g., when rail 2616 is axially coincident with bearing housing 2650). In some embodiments, an air gap between translator 2600 and stator 2650 need not be maintained in relief 2604. In some embodiments, a stator includes one or more reliefs to accommodate corresponding features of a translator during axial motion of the translator. For example, while a portion of a stator is configured to form an air gap with a translator (e.g., having a predetermined magnetic reluctance and dimensional tolerance with magnet section 2601), other portions of stator need not for an air gap with the translator.

Figure 27:
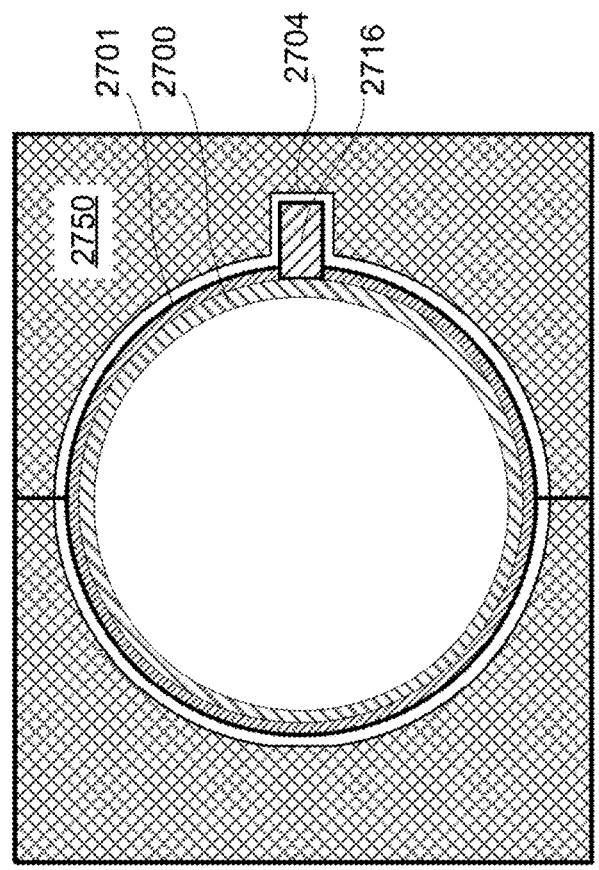
FIG. 27 shows a cross-sectional view of an illustrative translator and bearing housing, in accordance with some embodiments of the present disclosure.

FIG. 27 shows cross-sectional view of translator 2700 and bearing housing 2750, in accordance with some embodiments of the present disclosure. In some embodiments, bearing housing 2750 may include one or more reliefs 2704 to accommodate rail 2716 during axial motion of translator 2700 (e.g., when rail 2716 is axially coincident or otherwise overlapping with bearing housing 2750). As shown in FIG. 27, a gas bearing arranged radially between bearing housing 2750 and translator 2700 does not extend into one or more reliefs 2704. In some embodiments, a gas bearing arranged radially between bearing housing 2750 and translator 2700 does extend into one or more reliefs 2704. In some embodiments, bearing housing 2750 are of clamshell-type construction, as illustrated, wherein two components mate together to form the complete bearing housing 2750, as shown in FIG. 27. In some embodiments, a bearing housing may be constructed of a single azimuthally continuous housing (e.g., as illustrated in FIG. 24). It should be noted that for clarity and ease of illustration the drawings of the present patent application are not necessarily drawn to scale and do not reflect the actual or relative size of each feature. A bearing housing may be any suitable shape such as, for example, round, rectangular, polygonal, curved, or any other shape including a single segment or more than one segment. Although shown as cylindrical in the present disclosure, a translator "tube" may include any suitable cross-sectional shape or cross-sectional shape profile along its axial length. For example, a translator tube may include an outer surface that is a bearing surface, and the bearing surface may be flat, round, curved, segmented, or any other suitable profile at which a bearing gap may be formed to contain a gas bearing.

Figure 28:
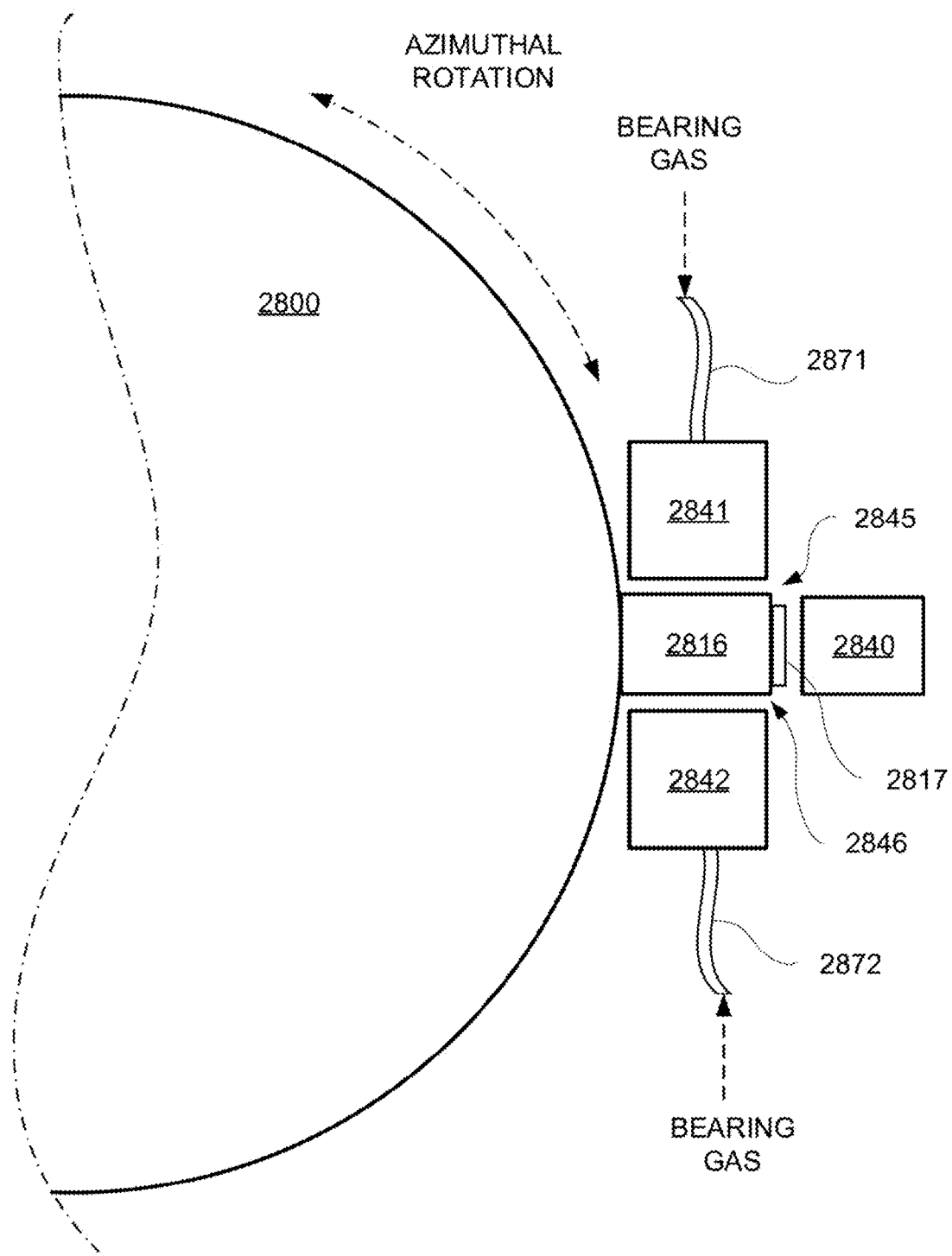
FIG. 28 shows an end view of an illustrative translator and additional components, in accordance with some embodiments of the present disclosure.

FIG. 28 shows an end view of translator 2800 and additional components, in accordance with some embodiments of the present disclosure. Translator 2800 includes rail 2816, which is at least partially rigidly affixed to a translator tube of translator 2800. Bearing gaps 2845 and 2846 are arranged between rail 2816 and bearing housings 2841 and 2842, respectively. Bearing gaps 2845 and 2846 are configured to be filled with a bearing gas having a pressure suitable for functioning as a gas bearing to maintain or otherwise constrain an azimuthal position of translator 2800 (e.g., during operation or other processes).

Bearing housings 2841 and 2842 are configured to interface to corresponding gas bearings, which in turn interface with corresponding surfaces of rail 2816. In some embodiments, bearing housings 2841 and 2842 are stationary relative to translator 2800. For example, bearing housings 2841 and 2842 may be rigidly or flexibly mounted to (e.g., fastened to), flexibly mounted to (e.g., mounted via a flexure to), or integrated into (e.g., be a single piece as) a stator, a bearing housing for constraining lateral motion of translator, a frame system, any other suitable stationary component, or any combination thereof. In some embodiments, bearing housings 2841 and 2842 are configured to generate corresponding gas bearings providing azimuthal stiffness to the orientation of translator 2800 (e.g., against azimuthal rotation of translator 2800, thus providing azimuthal anti-clocking). As illustrated, feed lines 2871 and 2872 are configured to provide bearing gas to respective bearing housings 2841 and 2842 (e.g., pressurized bearing gas supplied from a compressor or gas spring at greater than 1 atm). In some embodiments, contact bearings may be included instead of, or in addition to, gas bearings. For example, any or all of bearing housings 2841 and 2842 may alternatively include a bearing surface configured to contact rail 2816, or otherwise limit azimuthal rotation of rail 2816, while allowing rail 2816 to slide in the axial direction.

Position sensor 2840 is configured to sense a relative or absolute position of respective rails 2815 and 2816 (e.g., and accordingly the position of other features of translator 2800). In some embodiments, translator 2800 is a rigid assembly (e.g., with each component moving with substantially the same velocity other than vibrations, pressure-induced strain, or other small perturbations). In some embodiments, for example, position sensor 2840 may include an encoder read head (e.g., a magnetic or optical encoder read head), and rail 2816 include corresponding encoder tape 2817 (e.g., magnetic or optical tape). In some embodiments, position sensor 2840 may include an encoder read head (e.g., a magnetic or optical encoder read head), and rail 2816 includes one or more indexing features to indicate position. In some embodiments, position sensor 2840 is stationary relative to translator 2800, and is thus able to sense the relative motion of the translator with respect to a stator, a cylinder, a bearing housing, any other suitable component, or any combination thereof. For example, position sensor 2840 may be rigidly mounted to (e.g., fastened to), flexibly mounted to (e.g., mounted via a flexure to), or integrated into (e.g., be a single piece as) a stator, a bearing housing, a structural frame system, any other suitable stationary component, or any combination thereof. Position sensor 2840 may include an absolute sensor, a relative sensor, an incremental sensor, any other suitable sensor type for measuring a position of translator 2800, or any combination thereof.

Figure 29:
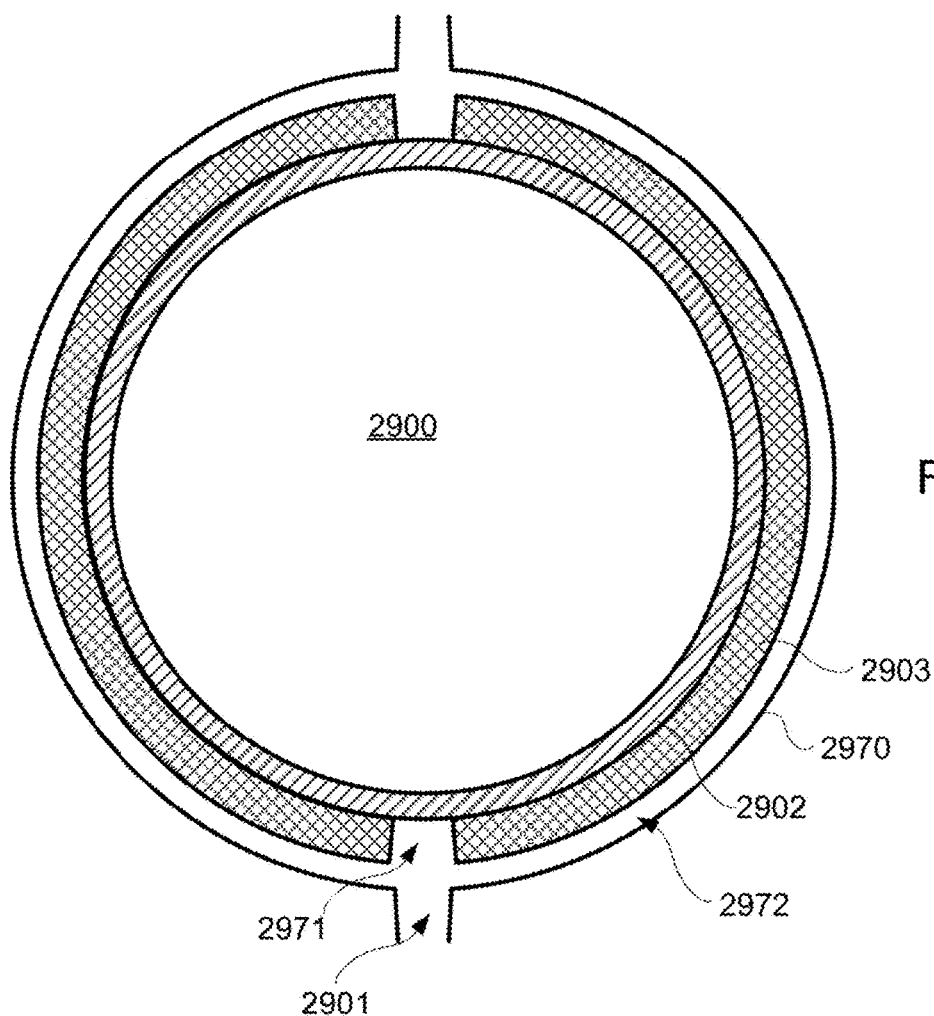
FIG. 29 shows a cross-sectional view of an illustrative translator and stator, in accordance with some embodiments of the present disclosure

FIG. 29 shows a cross-sectional view of illustrative translator 2900 and stator 2970, in accordance with some embodiments of the present disclosure. The cross-sectional view of FIG. 29 is taken at an axial location, showing translator tube 2902, magnet assembly 2903, and stator 2970. Magnet assembly 2903 is coupled to translator tube 2902 (e.g., using a press fit, fastening, bonding, or any other technique to form a rigid assembly). Stator 2970 may include, for example, phase windings and stator teeth (e.g., iron or steel, laminated sheets). Stator 2970 forms motor air gap 2972 with magnet assembly 2903 of translator 2900 (e.g., motor air gap 2972 affects electromagnetic interactions of stator 2970 and translator 2900 by changing the magnetic reluctance). In some embodiments, stator 2970 may include an azimuthal gap 2971 that continues the axial length of stator 2970 or a portion thereof, and magnet assembly 2903 of translator 2900 may include a corresponding azimuthal gap 2901 that continues the axial length of magnet assembly 2903 or a portion thereof. The gaps in the stator (e.g., gap 2971) and the magnet assembly (e.g., gap 2901) may be azimuthally aligned, and during operation, act to maintain an azimuthal relative position of magnetic assembly 2903 and stator 2970 (e.g., and thus the relative position of translator 2900 and stator 2970). Stator 2970 and translator 2900 may include any suitable number of corresponding gaps (e.g., a translator may include one or more gaps, and a stator may include one or more gaps), configured to provide anti-clocking of the translator. When corresponding gaps of the stator and translator are misaligned azimuthally, an electromagnetic force is generated causing the gaps to align. For example, in the event of azimuthal misalignment, a restoring force is generated. In some embodiments, the one or more gaps in the stator may allow for phase windings to be passed through for routing (e.g., by providing an open path for wires to be routed away from the phase windings). Although shown in FIG. 29 as being approximately equal, gap 2971 and gap 2901 need not be equal in azimuthal length. For example, in some embodiments, gap 2971 and gap 2901 may have different azimuthal lengths and their corresponding centerline azimuthal positions may align. In some embodiments, anti-clocking forces between the stator and translator may be the result of larger salience due to intentional gaps in the repetition of stator laminate pole teeth and the magnet segments of the translator. The intentional gaps can be utilized to optimize for force/power density and anti-rotation force by varying the width of the gap between stator laminate pole tooth, the width of the gap between translator poles (magnets), and the thickness of the magnets. In some embodiments, stator laminate pole teeth do not include any intentional anti-clocking gaps. In some embodiments, anti-clocking forces between the stator and translator may be the result of a smaller salience in the magnetic field and reluctance profile due to the segmentation of stator laminate pole teeth and magnet array. In some embodiments, the anti-clocking stiffness may be provided by the sum or accumulation effect of all the small anti-clocking forces, each spanning the small physical gap between adjacent stator tooth.

Figure 30:
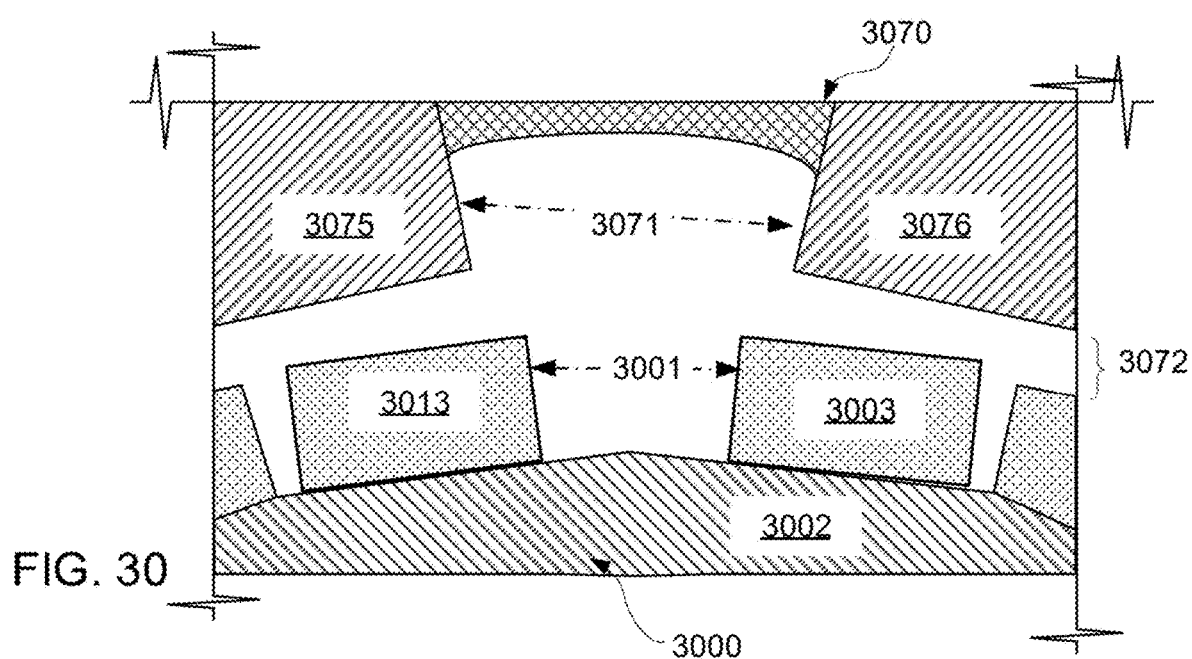
FIG. 30 shows a cross-sectional view of an illustrative translator and stator, in accordance with some embodiments of the present disclosure.

FIG. 30 shows a cross-sectional view of illustrative translator 3000 and stator 3070, in accordance with some embodiments of the present disclosure. The cross-sectional view of FIG. 30 is taken at an axial location, showing translator tube 3002, magnets 3003 and 3013, and stator 3070. Magnets 3003 and 3013 are coupled to translator tube 3002 (e.g., using a press fit, fastening, bonding, or any other technique to form a rigid assembly). Stator 3070 may include, for example, phase windings (not shown) and stator teeth 3075 and 3076. Stator 3070 forms motor air gap 3072 with magnets 3003 and 3013 of translator 3000 (e.g., motor air gap 3072 affects electromagnetic interactions of stator 3070 and translator 3000 by changing the magnetic reluctance). In some embodiments, stator 3070 may include an azimuthal gap 3071 that continues the axial length of stator 3070 or a portion thereof, and translator 3000 may include a corresponding azimuthal gap 3001 between magnets 3003 and 3013 that continues the axial length of a magnet array or a portion thereof.

In some embodiments, azimuthal gap 3071 is larger than, or equal to, azimuthal gap 3001. For example, as illustrated, azimuthal gap 3071 is larger than azimuthal gap 3001. It should be noted that for clarity and ease of illustration these drawings are not necessarily drawn to scale.

Figure 31:
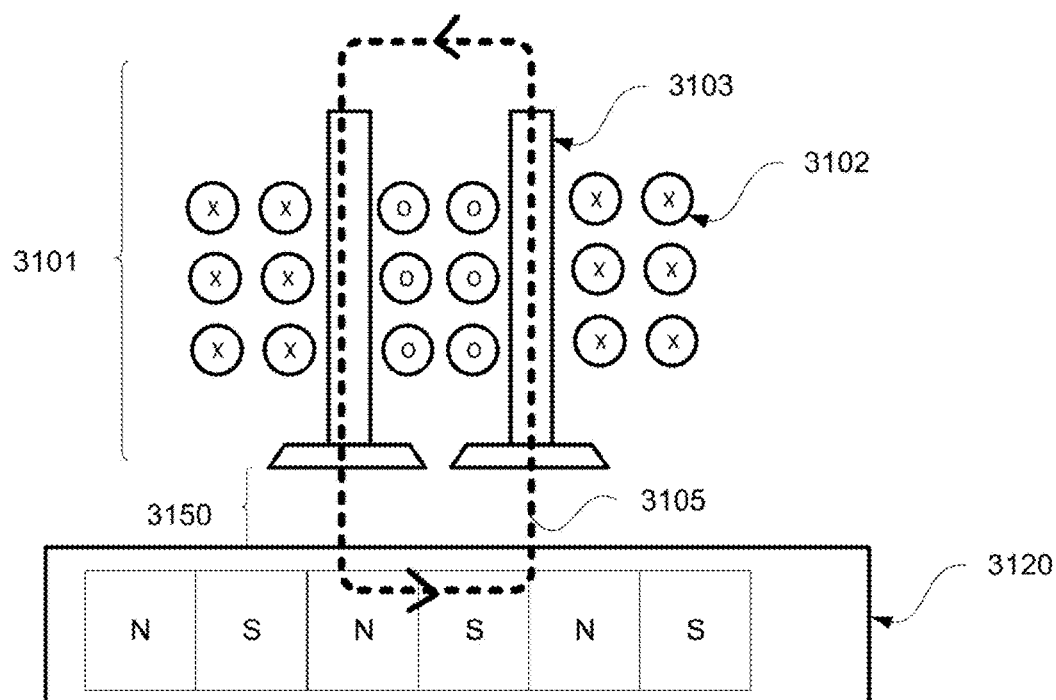
FIG. 31 shows a block diagram of an illustrative LEM, which includes an illustrative motor air gap, in accordance with some embodiments of the present disclosure.

FIG. 31 shows a block diagram of a LEM, which includes illustrative motor air gap 3150, in accordance with some embodiments of the present disclosure. Stator 3101 includes stator teeth 3103, windings 3102, and any other suitable components (not shown), in accordance with the present disclosure. Translator 3120 includes an array of magnets (e.g., shown as having polarity orientation N or S in FIG. 31). Stator teeth 3103 and translator 3120 form motor air gap 3150. When current is applied to windings 3102 (e.g., as illustrated by "X" representing current into the page, and "O" representing current out of the page), a magnetic flux is generated (e.g., as illustrated by magnetic flux 3105). Motor air gap 3150 affects magnetic flux 3105 (e.g., by affecting the reluctance of the magnetic circuit). Windings 3102 may be wound in any suitable orientation, and optionally coupled to in any suitable configuration (e.g., in series in either winding orientation).

Figure 32:
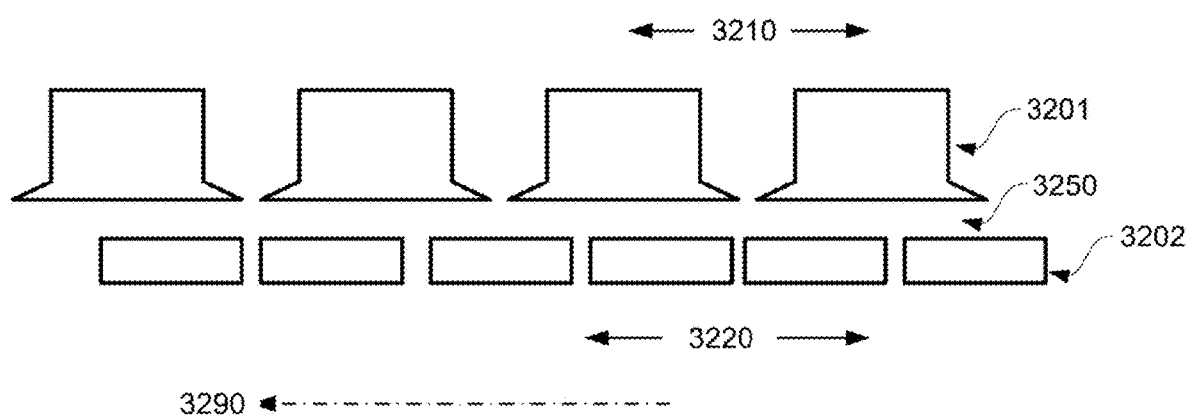
FIG. 32 shows a block diagram of illustrative motor air gap, having a pole-pitch configuration, in accordance with some embodiments of the present disclosure.

FIG. 32 shows a block diagram of illustrative motor air gap 3250, having a pole-pitch configuration, in accordance with some embodiments of the present disclosure. Stator 3201 includes slot pitch 3210, and translator section 3203 includes pole pitch 3220. In some embodiments, slot pitch 3210 and pole-pitch 3220 may be selected to affect electromagnetic interactions between stator 3201 and translator section 3203. For example, in some embodiments, slot pitch 3210 and pole-pitch 3220 may be selected as unequal to reduce cogging forces. In an illustrative example, a ration of pole pitch 3220 to slot pitch 3210 may be approximately 14/15. It will be understood that a LEM may include any suitable slot pitch and pole pitch, in accordance with the present disclosure. In some embodiments, the slot pitch 3201 may change between hoops based on the location of the hoop within the stator stack. In some embodiments, since the velocity profile of the translator may be highest at the midpoint of the stroke, a longer slot pitch in the middle of the stator would lower the phase frequency and the concomitant core losses, which increases proportionally to the square of the frequency. Similarly, a shorter stator slot pitch at an end of the stator would increase the phase frequency, or EMF-per-turn, where the translator is moving at a slower speed, allowing a greater contribution of force/work from the end windings. Therefore, in some embodiments, the hoops located at the end sections of the stator may include a shorter stator slot pitch as compared to the stator slot pitch for hoops in the center section of the stator.

FIG. 33 shows a block diagram of illustrative LEM system 3300, in accordance with some embodiments of the present disclosure. LEM system 3300, as illustrated, includes control system 3310, power electronics 3320, cooling system 3321, sensors 3311, stator 3350, translator 3360, bearing housings 3330 and 3331, bearing gas management system 3380, and bearing gas supply 3390. Components of LEM system 3300 are coupled, as illustrated, by a gap interface, signal interface, flow interface, mechanical interface, phase lead interface, or a combination thereof. For example, translator 3360 is coupled to stator 3350 by a gap interface (e.g., a motor air gap), bearing housing 3330 by a gap interface (e.g., a bearing interface such as a gas bearing), and bearing housing 3331 by a gap interface (e.g., a bearing interface such as a gas bearing).

Control system 3310 is configured to interface with (e.g., provide control signals to, receive feedback from) power electronics 3320 to control currents in phases of stator 3350 (e.g., as described in the context of FIG. 34). Power electronics 3320 is coupled to stator 3350 by a plurality of phase leads, which may include lengths of electrically conductive material, electrical terminals and terminations, connectors, sensors (e.g., current sensors), any other suitable components, or any combination thereof. Control system 3310 is configured to interface with (e.g., provide control signals to, receive feedback from) cooling system 3321 to control cooling of stator 3350 (e.g., to remove heat from windings, stator teeth, hoops, or a combination thereof). For example, cooling system 3321 may include one or more cooling jackets, plenums, manifolds, pumps, compressors, filters, sensors, any other suitable components, or any combination thereof. In a further example, cooling system 3321 may exchange heat and fluid with a reservoir (e.g., the environment provides cooling air and accepts heated air). In a further example, control system 3310 may be communicatively coupled to cooling system 3321 and is configured to provide a control signal to cooling system 3321 to cause heat removal from a plurality of windings of stator 3350. Control system 3310 is configured to interface with (e.g., provide control signals to, receive sensor signals from) sensors 3311, which may include, for example, Bearing housings 3330 and 3331 may include any suitable number and type of bearing housing, in accordance with the present disclosure. As illustrated, bearing housings 3330 and 3331 are configured for gas bearings (e.g., using bearing gas management system 3380 and bearing gas supply 3390), although a LEM system may include any suitable type of bearing (e.g., contact or non-contact). In some embodiments, one or more sensors is coupled to each bearing housings 3330 and 3331, configured to sense, for example, bearing gas pressure, bearing gas temperature, bearing gas flow rate, bearing housing acceleration (e.g., an accelerometer may be affixed to a bearing housing to measure vibration), bearing housing temperature, any other suitable property or behavior, or any combination thereof.

Bearing gas management system 3380 is configured to control at least one aspect of respective bearing gas provided to bearing housings 3330 and 3331. For example, bearing gas management system 3380 may include one or more filters, compressors, pumps, pressure regulators, valves, sensors, any other suitable components, or any combination thereof for providing bearing gas to bearing housings 3330 and 3331. For example, control system 3310 is configured to interface with (e.g., provide control signals to, receive feedback from) bearing gas management system 3380 for controlling at least one property of the bearing gas. In a further example, control system 3310 is configured to interface with (e.g., provide control signals to, receive feedback from) bearing gas management system 3380 for controlling a stiffness of the bearing interface (e.g., to lateral displacement of translator 3360) between translator 3360 and bearing housings 3330 and 3331. Bearing gas supply 3390 may include one or more filters, compressors, pumps, pressure regulators, valves, sensors, any other suitable components, or any combination thereof for providing bearing gas to bearing gas management system 3380. In some embodiments, bearing gas management system 3380 and bearing gas supply 3390 may be combined as a single system. In some embodiments, bearing gas supply 3390 need not be included (e.g., bearing gas management system 3380 may intake atmospheric air).

In some embodiments, stator 3350 includes a plurality of coils and an axis, translator 3360 is arranged to move axially along the axis, and bearing housing 3330, bearing housing 3331, or both are coupled to stator 3350 to constrain lateral motion of translator 3360. For example, the coils include windings that interface with a plurality of stator teeth that define an axis (e.g., an axis of a stator bore). In some such embodiments, control system 3310 is configured to control axial displacement of the translator, and control lateral displacement of the translator. For example, bearing housing 3330, bearing housing 3331, or both, and translator 3360 form a bearing interface, and control system 3310 is configured to control a stiffness of the bearing interface against the lateral displacement of translator 3360. In an illustrative example, the bearing interface may include a gas bearing interface configured for oil-less operation (e.g., without the use of liquid lubricant).

In some embodiments, bearing gas management system 3380 is configured to provide a pressurized gas to the bearing interface. In some such embodiments, control system 3310 is communicatively coupled to bearing gas management system 3380 and is configured to provide a control signal to bearing gas management system 3380 to cause the pressurized gas to be provided to the bearing interface. For example, control system 3310 may cause bearing gas management system 3380 to control a property of the pressurized gas to control the lateral stiffness to lateral displacement of the translator. To illustrate, bearing gas management system 3380 may provide a pressurized gas to the bearing gap by opening a valve. To further illustrate, bearing gas management system 3380 may provide pressurized gas by controlling a valve, a pressure regulator, or both.

In some embodiments, power electronics 3320 are coupled to a plurality of windings of stator 3350. Control system 3310 is communicatively coupled to power electronics 3320 and is configured to provide a control signal to power electronics 3320 to cause electrical current to flow in at least one winding of the plurality of windings to control the axial displacement of translator 3360.

In some embodiments, one or more sensors of LEM system 3300 include a position sensor that senses an axial position of translator 3360 relative to stator 3350. In some such embodiments, control system 3310 is communicatively coupled to the sensor (e.g., of sensors 3311) and is configured to cause electrical current to flow in the plurality of windings of stator 3350 based on the axial position of translator 3360. In some embodiments, control system 3310 is configured to estimate an axial position of translator 3360 relative to stator 3350 and cause electrical current to flow in the plurality of windings of stator 3350 based on the axial position of translator 3360.

In some embodiments, translator 3360 includes at least one rail having a rail surface (e.g., as illustrated in FIGS. 16-18 and FIG. 28). System 3300 may optionally include at least one anti-clocking bearing housing (e.g., bearing housing 3332) coupled to stator 3350 and configured to constrain azimuthal motion of translator 3360, wherein anti-clocking bearing housing 3332 and the rail surface form a rail interface. For example, control system 3310 is configured to cause the rail interface to achieve a stiffness against azimuthal motion of the translator.

In some embodiments, bearing housing 3330 is arranged on a first longitudinal side of stator 3350 to constrain the lateral motion of translator 3360 at the first longitudinal side of stator 3350, and bearing housing 3331 is arranged on a second longitudinal side of stator 3350 to constrain the lateral motion of translator 3360 at the second longitudinal side of stator 3350.

In some embodiments, control system 3310 is configured to control a LEM by causing electric current to flow in at least one winding of a plurality of windings of a stator to apply a force on a translator along a longitudinal axis of the stator, and controlling lateral stiffness to lateral displacement of the translator arranged to move along a longitudinal axis of the stator. For example, the translator and the stator may form a motor air gap, and the lateral stiffness provided by the bearings is capable of maintaining the motor air gap in an operable range. For example, causing electric current to flow at least one winding may include providing a control signal to power electronics 3320 that are electrically coupled to the plurality of windings. In a further example, In some embodiments, control system 3310 is configured to monitor a property of the bearing gas, bearing housing, or both, for a fault condition and, in response to an identification of the fault condition, brake the translator. For example, control system 3310 may brake the translator by causing power electronics 3320 to apply currents to phases of stator 3350 that cause a force on translator 3360 that oppose motion of translator 3360 (e.g., thus reducing a velocity of, or even stopping translator 3360). To illustrate, control system 3310 may monitor a mass flowrate of bearing gas, a pressure of bearing gas, a temperature of bearing gas, a temperature of a bearing housing, a vibration of a bearing housing, a force load on a bearing housing, a translator position trajectory, or a combination thereof.

FIG. 34 shows a diagram of illustrative system 3400, in accordance with some embodiments of the present disclosure. System 3400 includes LEM 3440, power electronics system 3430, control system 3450, and auxiliary system 3470. System 3400 may be referred to as a LEM system. It will be understood that while shown separately in FIG. 34, LEM 3440 and power electronics system 3430 may be integrated, or otherwise combined to any suitable extent. For example, in some embodiments, LEM 3440 and power electronics system 3430 may be affixed (e.g., directly or indirectly) to one another and coupled by phase leads 3435. In a further example, in some embodiments, power electronics system 3430 may be integrated as part of LEM 3440. In a further example, LEM 3440 may include a stator having a plurality of phases and a translator (e.g., and other suitable components such as cylinders, bearings, plumbing, etc.), with phase leads 3435 that are coupled to DC bus 3425 by power electronics system 3430.

In some embodiments, LEM 3440 may include one or more translators which may undergo reciprocating motion relative to corresponding one or more stators under the combined effects of gas pressures and electromagnetic forces. The translators may, but need not, include permanent magnets, which may generate a back electromotive force (emf) in phases of the respective stator. It will be understood that, as used herein and as widely understood, back emf refers to a voltage. Power electronics system 3430 are configured to control current in the phases of the stator of a LEM. For example, power electronics system 3430 may expose phase leads of phases of a stator to one or more buses of a DC bus, a neutral, a ground, or a combination thereof.

Power electronics system 3430 may include, for example, switches (e.g., insulated gate bipolar transistors (IGBTs), metal oxide semiconductor field effect transistor (MOSFET)), diodes, current sensors, voltage sensors, circuitry for managing PWM signals, any other suitable components, or any suitable combination thereof. For example, power electronics system 3430 may include one or more H-bridges, or other motor control topology of switches for applying current to one or more phases. In some embodiments, power electronics system 3430 may interface with LEM 3440 via phase leads 3435 which couple to windings of the stators, and power electronics system 3430 may interface with a grid-tie inverter (not shown) via DC bus 3425 (e.g., a pair of buses, one bus at a higher voltage relative to the other bus). Bus 3422 and bus 3424 together form DC bus 3425 in system 3400. For example, bus 3422 may be at nominally 800V relative to 0V of bus 3424 (e.g., bus 322 is the "high" and bus 324 is the "low"). Bus 3422 and bus 3424 may be at any suitable, nominal voltage (e.g., >100 VDC, >200 VDC, >400 VDC, >600 VDC, over 800 VDC), which may fluctuate in time about a mean value, in accordance with the present disclosure. Accordingly, the term "DC bus" as used herein shall refer to a pair of buses having a roughly fixed mean voltage difference, although the instantaneous voltage may fluctuate, vary, exhibit noise, or otherwise be non-constant.

Figure 35:
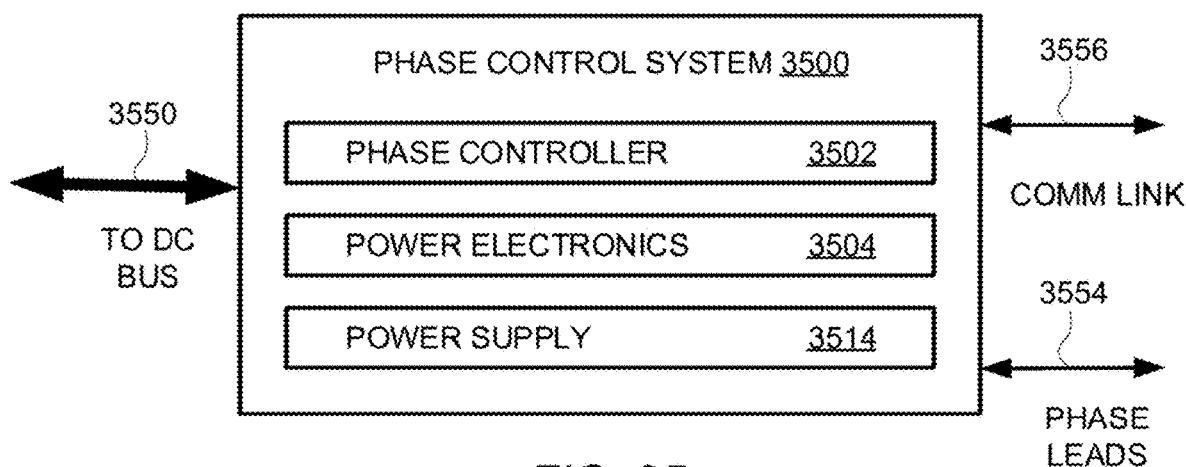
FIG. 35 shows a block diagram of an illustrative phase control system, in accordance with some embodiments of the present disclosure.

FIG. 35 shows a block diagram of illustrative phase control system 3500, in accordance with some embodiments of the present disclosure. Phase control system 3500, as shown illustratively in FIG. 35, includes phase controller 3502, power electronics 3504, and power supply 3514. In some embodiments, each phase control system (e.g., similar to phase control system 3500) controls an application of current to a single phase of a multiphase stator. Further, each phase control system may include elements of the overall electrical system distributed to each phase control system (e.g., elements of control system 3450, power electronics system 3430, and auxiliary systems 3470 of FIG. 34). In an illustrative example, phase control system 3500 may be included along with other phase controllers (e.g., other similar controllers) to control phase of a plurality of phases of a stator.

In some embodiments, phase controller 3502 is configured to control current in one or more phases of a stator. In some embodiments, a desired or commanded current to be applied to the corresponding phase is calculated locally by phase controller 3502. In some embodiments, a desired or commanded current to be applied to the one or more phases is communicated from a central controller, which determines currents to be applied on each of the phases (e.g., of the stator, and optionally other phases of other stators). For example, the desired or commanded current to be applied to the one or more phases may be determined to achieve a measured magnet or translator position, to achieve a total LEM force (e.g., summed from the electromagnetic force applied by each phase), to a achieve a translator velocity or acceleration, to achieve a desired translator position (e.g., an apex position), or any combination thereof.

In some embodiments, phase controller 3502 is configured to sense magnetic flux in the corresponding phase. For example, phase controller 3502 may sense the phase's magnetic flux and use the sensed flux as a control feedback. In some such embodiments, phase controller 3502 need not include a current sensor or be configured to receive input from a current sensor. Further, in some such embodiments, phase controller 3502 includes a current sensor with relatively reduced performance, requirements, cost, or a combination thereof.

In some embodiments, the current applied to or voltage applied across each phase is controlled locally (i.e., by an instance of phase control system 3500) to any suitable degree. In some embodiments, phase controller 3502 may execute a local control loop on phase current. For example, a current command may be communicated over a communication link from a central controller to phase controller 3502. Any suitable part of the control mechanism may also be distributed in accordance with the present disclosure. For example, a position measurement may be distributed to every phase and each phase controller 3502 may determine desired position and force to determine a current command, which may be applied by power electronics 3504.

In some embodiments, phase controller 3502 is configured to provide a control signal to power electronics 3504. Power electronics 3504 is configured to electrically couple to the phase leads of the phase, and provide the current to the phase. Accordingly, power electronics 3504 includes components configured for amperages and voltages relevant to the DC bus and phase leads. For example, power electronics 3504 may include any suitable components of power electronics system 3430 of FIG. 34. Phase controller 3502 need not be configured to electrically manage or interact with such large currents or voltages as required by the phase leads and power electronics 3504. In some embodiments, phase controller 3502 and power electronics 3504 may be combined or integrated into a single module configured to control and apply current to the phase. In some embodiments, power electronics 3504 may be shared among more than one phase. For example, power electronics 3504 may include multiple power circuits, be configured to receive multiple control signals, and be configured to apply current to more than one phase.

In some embodiments, each phase control system may estimate position of the translator relative to the stator, rather than a central algorithm estimating or measuring position. Accordingly, the central algorithm may be distributed among several phase control systems. In some embodiments, each position estimator for multiple phase control systems may be part of a distributed position estimator. The distributed position estimator may estimate position based on, for example, the sensing of phase voltage in each corresponding phase. In some such embodiments, a dedicated position sensor need not be included, thus saving the cost and reliability concerns of the position sensor.

Power supply 3514 is configured to power components of phase control system 3500, aside from applying current to the corresponding phase. For example, power supply 3514 may provide power for processing functions of phase controller 3502, diagnostics (e.g., for power electronics 3504), any other suitable process requiring power, or any suitable combination thereof. In some embodiments, each phase control system may include a power supply (e.g., similar to power supply 3514).

In some embodiments, suitable components of phase control system 3500 may be coupled to grid via coupling 3550. For example, power electronics 3504, may be coupled to coupling 3550. In some embodiments, coupling 3550 may include cables or buses transmitting AC power (e.g., three-phase 480VAC). In some embodiments, coupling 3550 may include cables or buses transmitting DC power (e.g., a DC bus), which may be coupled to a grid via a grid-tie inverter separate from phase control system 3500, for example.

In some embodiments, suitable components of phase control system 3500 may be coupled to one or more phases of a LEM via phase leads 3554. For example, power electronics 3504 may be coupled to phase leads 3554. In some embodiments, phase leads 3554 may include two phase leads per phase corresponding to phase control system 3500 (e.g., six phase leads of three phases correspond to phase control system 3500, or a full bridge topology). In some embodiments, phase leads 3554 may include one phase lead per phase corresponding to phase control system 3500 (e.g., six phase leads of six wye-connected phases correspond to phase control system 800, or a half-bridge topology). In some embodiments, phase leads may be wired in a star configuration. For example, for a wye-type configuration, one phase lead from each phase may be coupled together to form a neutral (e.g., having net zero current input or output, so phase currents must sum to zero), while each phase control system applies a controlled phase voltage, and thus current, to the other lead of the corresponding phase. In some such embodiments, only some of the DC bus voltage (e.g., the difference between a bus and the neutral voltage) may be available to apply across each phase. In some embodiments, phase leads for each phase may be wired in an independent configuration. For example, a phase control system may include a full H-bridge per phase, and may be able to apply the full DC bus voltage across the phase in either direction (e.g., to cause a desired current to flow in either direction). This configuration provides a larger voltage range available to each phase as well as control independence from the other phases. For example, without a common neutral wye connection, the phase currents need not sum to zero.

In some embodiments, suitable components of phase control system 3500 may be coupled to communications (COMM) link 3556. For example, phase controller 3502, power electronics 3504, power supply 3514, or a combination thereof may be coupled to COMM link 3556. In some embodiments, COMM link 3556 may include a wired communications link such as, for example, an ethernet cable, a serial cable, any other suitable wired link, or any combination thereof. In some embodiments, COMM link 3556 may include a wireless communications link such as, for example, a WiFi transmitter/receiver, a Bluetooth transmitter/receiver, any other suitable wireless link, or any combination thereof. COMM link 3556 may include any suitable communication link enabling transmission of data, messages, signals, information, or a combination thereof. In some embodiments, phase control system 3500 is coupled to a central control system via communications link 3556. For example, in some embodiments, phase controller 3502 communicates with a central controller via COMM link 3556.

In some embodiments, phase control system 3500 may be configured to extract power from the corresponding phase of the LEM. For example, in the event of a detected system failure or loss of communication, phase controller 3502 may attempt to extract energy from the kinetic energy of a translator by commanding current in the opposite direction of a back emf in the corresponding phase.

In some embodiments, which include a long stator and short magnet section (e.g., the phases extend spatially beyond a magnet section), some phases are unused for at least some of the magnet travel. For example, when a portion of a magnet section is not under a phase (e.g., not axially overlapping with at least some of the phase), the phase will not interact electromagnetically with the magnet section in a significant way. Unused phases may be used as inductors and phase control system 3500 may be configured to store energy in capacitors or perform power conversion to help regulate the DC bus voltage, bus current, bus power, or a combination thereof. Accordingly, phase control system 3500, or phase controller 3502 thereof, may be used for other purposes besides exciting an electromagnetic force in the LEM.

In some embodiments, a LEM, or components thereof, may be tested, operated, characterized, measured, or otherwise interrogated. For example, a stator may be coupled by phase leads to power electronics, and current may be applied to phases to measure ohmic resistance, measure winding inductance, test for shorts among windings, test thermal response of the stator, test power electronics, test a control system, or a combination thereof. In a further example, a LEM may be coupled to power electronics by phase leads, coupled to a cooling system, and coupled to a bearing gas management system. The control system may cause the power electronics to apply current to the phase leads (e.g., to cause the translator to move axially and achieve a desired trajectory), cause the cooling system to provide a coolant (e.g., cooling air) to the stator, cause bearing gas to be provided to one or more bearing housings, and cause bearing gas to be provided to one or more anti-clocking bearing housings.

In an illustrative example, a LEM may be included as part of a linear generator (e.g., as illustrated in FIG. 36). The ability to test the LEM, and components thereof, without first installing, for example, in a linear generator or other system may allow easier maintenance, trouble-shooting, and characterization of the LEM, without the complexity of the additional components of the linear generator. For example, a linear generator may include two LEMs, and it is advantageous to be able to test either LEM as a stand-alone unit. In some embodiments, an external energy source provides the force to cause translator movement (e.g., including a compressor, electromagnetic source, or other suitable source). In some embodiments, a LEM may be operated as a stand-alone unit as part of a generator, pump, compressor, or actuator.

FIG. 36 shows a cross-sectional view of illustrative generator assembly 3600, in accordance with some embodiments of the present disclosure. Generator assembly 3600 is configured as an opposed, free-piston generator. Generator assembly 3600 includes translators 3610 and 3620, which are configured to move along axis 3606 (e.g., translate linearly along axis 3606). Translators 3610 and 3620 are configured to move within cylinders 3602, 3604 and 3605, thus forming expansion and compression volumes 3697, 3698, and 3699 for performing boundary work (e.g., determined using the integral f PdV over a suitable range such as a stroke or cycle). For clarity, the spatial arrangement of the systems and assemblies described herein will generally be referred to in the context of cylindrical coordinates, having axial, radial, and azimuthal directions. It will be understood that any suitable coordinate system may be used (e.g., cylindrical coordinates may be mapped to any suitable coordinate system), in accordance with the present disclosure. Note that axis 3606 is directed in the axial direction, and the radial direction is defined as being perpendicular to axis 3606 (e.g., directed away from axis 3606). The azimuthal direction is defined as the angular direction around axis 3606 (e.g., orthogonal to both axis 3606 and the radial direction, and directed around axis 3606).

In some embodiments, the stationary components of generator assembly 3600 include cylinder 3602, cylinder 3604, cylinder 3605, stator 3618, stator 3628, bearing housing 3616, bearing housing 3617, bearing housing 3626, and bearing housing 3627. In some embodiments, bearing housings 3616 and 3617 are coupled to stator 3618 (e.g., either directly connected, or coupled by an intermediate component such as a flexure, mount, or both). For example, bearing housings 3616 and 3617 may be aligned to (e.g., laterally or axially aligned), and affixed to, stator 3618 to maintain a radial air gap between magnet assembly 3613 and stator 3618. Similarly, in some embodiments, bearing housings 3626 and 3627 are rigidly coupled to stator 3628. In a further example, in some embodiments, bearing housing 3626 and 3627 are aligned to stator 3618, but affixed to another portion of a generator assembly or components thereof.

Translator 3610 includes tube 3612, piston 3611, piston 3614, and magnet assembly 3613, all substantially rigidly coupled to move as a substantially rigid body along axis 3606, relative to the stationary components. Translator 3620 includes tube 3622, piston 3621, piston 3624, and magnet assembly 3623, all substantially rigidly coupled to move as a substantially rigid body along axis 3606. In some embodiments, magnet assemblies 3613 and 3623 may be a region of tubes 3612 and 3622, respectively. In some embodiments, magnet assemblies 3613 and 3623 may include separate components affixed to tubes 3612 and 3622, respectively. Reaction section 3697 is bounded by pistons 3611 and 3621, as well as bore 3603 of cylinder 3602. Gas springs 3698 and 3699 are bounded by respective pistons 3614 and 3624, as well as respective cylinders 3604 and 3605. Accordingly, as translators 3610 and 3620 move along axis 3606, the volumes of reaction section 3697, gas spring 3698, and gas spring 3699 expand and contract. Further, for example, pressures within those volumes decrease or increase as the volume increases or decreases, respectively. Each of bearing housings 3616, 3617, 3626, and 3627 is configured to provide a gas bearing between itself and the corresponding translator (e.g., tube 3612 and 3622). For example, each of bearing housings 3616, 3617, 3626, and 3627 may be configured to direct pressurized gas to the gas bearing (e.g., via a flow system). In an illustrative example, each of bearing housings 3616, 3617, 3626, and 3627 may be configured to direct pressurized gas having an absolute pressure greater than ambient pressure (e.g., 1 atm at sea level) to the gas bearing such that bearing gas has sufficient pressure to flow through the gas bearing and into the environment (e.g., directly or via other ducting). In some embodiments, bearing gas may be pressurized relative to the environment (e.g., about 1 atm), a pressure in a breathing system (e.g., a boost pressure, or a gas pressure in an exhaust system that may be greater than or less than 1 atm), or any other suitable pressure reference. In some embodiments, generator assembly 3600 is configured for oil-less operation (e.g., without the use of lubricating liquids or without the use of solid-to-solid contact bearings), with bearing housings 3616, 3617, 3626, and 3627 forming gas bearings against translators 3610 and 3620. Cylinder 3602 includes bore 3603, which houses compression section 3697. Cylinder 3602 also includes illustrative ports 3619 and ports 3629, which couple bore 3603 to the outside of cylinder 3602 to allow fluid exchange.

Stator 3618, magnet assembly 3613, tube 3612, and bearing housings 3616 and 3617 form linear electromagnetic machine (LEM) 3656. Similarly, stator 3628, magnet assembly 3623, tube 3622, and bearing housings 3626 and 3628 form LEM 3652. Further, a LEM may optionally include one or more pistons affixed to the translator. For example, a LEM may be defined to include stator 3618, translator 3610, and bearing housings 3616 and 3617. In a further example, a LEM may be defined to include stator 3628, translator 3620, and bearing housings 3626 and 3627. A LEM includes a stationary assembly (e.g., a stator and bearing housings) and a translating assembly (e.g., a translator) that is constrained to move along an axis, wherein the stator is capable of applying an electromagnetic force on the translator to cause and/or effect motion along the axis. The bearing housings of a LEM may be, but need not be, affixed to the stator. For example, the bearings housings may be coupled to the stator, a structural frame, a cylinder, either directly or by one or more intervening components, or any combination thereof. Stators 3618 and 3628 may include a plurality of phase windings, which form a plurality of phases. The current in each of the phases may be controlled by a control system (e.g., which may include corresponding power electronics and processing equipment) to affect the position of translators 3610 and 3620, motion of translators 3610 and 3620, work interactions with translators 3610 and 3620, or any combination thereof. In some embodiments, magnet assemblies 3613 and 3623 include permanent magnets arranged in an array (e.g., of alternating North and South poles). Because translators 3610 and 3620 move as substantially rigid assemblies, electromagnetic forces applied to respective magnet assemblies 3613 and 3623 accelerate and decelerate translators 3610 and 3620. In some embodiments, stators 3618 and 3628 may be air-cooled (e.g., by an air cooling system), liquid-cooled (e.g., by a liquid cooling system), or both. In some embodiments, stators 3618 and 3628 are arranged around respective translators 3610 and 3620, or respective magnet assemblies 3613 and 3623 thereof (e.g., the motor air gap is arcuate with a thickness profile). For example, stators 3618 and 3628 may extend fully around (e.g., 360 degrees azimuthally around) or partially around (e.g., having azimuthally arranged segments and azimuthally arranged gaps between windings of a phase) respective translators 3610 and 3620. In some embodiments, stators 3618 and 3628 are arranged axially along respective translators 3610 and 3620, or respective magnet assemblies 3613 and 3623 thereof. For example, magnet assemblies 3613 and 3623 may include flat magnet sections and stators 3618 and 3628 may include flat surfaces that correspond to the magnet sections (e.g., the motor air gap is planar with a thickness profile). In some embodiments, stators 3618 and 3628 extend axially along respective translators 3610 and 3620, or respective magnet assemblies 3613 and 3623 thereof.

It will be understood that the present disclosure is not limited to the embodiments described herein and can be implemented in the context of any suitable system. In some suitable embodiments, the present disclosure is applicable to reciprocating engines and compressors. In some embodiments, the present disclosure is applicable to free-piston engines and compressors. In some embodiments, the present disclosure is applicable to combustion and reaction devices such as a reciprocating engine and a free-piston engine. In some embodiments, the present disclosure is applicable to non-combustion and non-reaction devices such as reciprocating compressors and free-piston compressors. In some embodiments, the present disclosure is applicable to linear reciprocating devices with driver section (e.g., gas springs). In some embodiments, the present disclosure is applicable to oil-free reciprocating and free-piston engines and compressors. In some embodiments, the present disclosure is applicable to oil-free free-piston engines with internal or external combustion or reactions. In some embodiments, the present disclosure is applicable to oil-free free-piston engines that operate with compression ignition (e.g., homogeneous charge compression ignition (HCCI), stratified charge compression ignition (SCCI), or other compression ignition), spark ignition, or both. In some embodiments, the present disclosure is applicable to oil-free free-piston engines that operate with gaseous fuels, liquid fuels, or both. In some embodiments, the present disclosure is applicable to linear free-piston engines. In some embodiments, the present disclosure is applicable to engines that can be combustion engines with internal combustion/reaction or any type of heat engine with external heat addition (e.g., from a heat source or external reaction such as combustion).

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A stator for a linear electromagnetic machine, the stator comprising:
    a plurality of winding hoops constrained and fixedly aligned, wherein:
        each winding hoop of the plurality of winding hoops engages with a respective set of stator teeth of a plurality of sets of stator teeth,
        at least one set of stator teeth of the plurality of sets of stator teeth comprises a first azimuthal gap between adjacent stator teeth of the at least one set of stator teeth,
        a translator of the linear electromagnetic machine comprises a second azimuthal gap, and
        an interaction between the first azimuthal gap and the second azimuthal gap provides an anti-clocking force on the translator that acts against azimuthal rotation of the translator relative to the stator.

2. The stator of claim 1, wherein each stator tooth of the plurality of sets of stator teeth comprises a mounting feature to engage with a winding hoop of the plurality of winding hoops.

3. The stator of claim 1, wherein the plurality of sets of stator teeth are arranged to form a stator bore.

4. The stator of claim 1, wherein a first tooth of the at least one set of stator teeth of the plurality of sets of stator teeth comprises:
    a first axial feature arranged on a first axial side to engage a second stator tooth of a first axially adjacent set of teeth; and
    a second axial feature arranged on a second axial side and configured to engage a third stator tooth of a second axially adjacent set of teeth, wherein the second axial side is opposite the first axial side.

5. The stator of claim 1, wherein:
    the at least one set of stator teeth comprises a plurality of azimuthal gaps between respective pairs of adjacent stator teeth of the at least one set of stator teeth; and
    the plurality of azimuthal gaps comprises the first azimuthal gap.

6. The stator of claim 5, wherein the first azimuthal gap is larger than other gaps of the plurality of azimuthal gaps.

7. The stator of claim 1, wherein each respective stator tooth of the plurality of sets of stator teeth comprises a respective slot pitch.

8. The stator of claim 7, wherein the respective slot pitch of each respective stator tooth is based on an axial location of the respective stator tooth.

9. The stator of claim 7, wherein the respective slot pitch of each respective stator tooth is based on a phase frequency of a respective winding hoop engaged with a corresponding set of stator teeth.

10. The stator of claim 1, wherein the stator is to interact with the translator to provide the anti-clocking force to cause the anti-clocking force to one or more of prevent or reduce the azimuthal rotation of the translator while the translator moves linearly relative to the stator.

11. The stator of claim 10, wherein the stator is to interact with the translator using one or more permanent magnets.

12. The stator of claim 10, wherein the stator is to interact with the translator using electromagnets.

13. The stator of claim 10, wherein the translator comprises an induction section and the stator is to interact with the translator using the induction section.

14. A set of teeth for use in a stator, the set of teeth comprising:

at least one tooth comprising a mounting feature configured to engage with a winding hoop; and a first azimuthal gap between adjacent teeth of the set of teeth, wherein:

a translator comprising a second azimuthal gap is configured to interact with the set of teeth of the stator, and an interaction between the first azimuthal gap and the second azimuthal gap provides an anti-clocking force on the translator that acts against azimuthal rotation of the translator relative to the stator that uses the set of teeth.

15. The set of teeth of claim 14, wherein the set of teeth are arranged to form a stator bore.

16. The set of teeth of claim 14, wherein the set of teeth is to interact with the translator to provide the anti-clocking force to cause the anti-clocking force to one or more of prevent or reduce the azimuthal rotation of the translator while the translator moves linearly relative to the set of teeth.

17. The set of teeth of claim 14, further comprising a plurality of azimuthal gaps between respective pairs of teeth of the set of teeth, wherein the plurality of azimuthal gaps comprises the first azimuthal gap.

18. The set of teeth of claim 17, wherein the first azimuthal gap is larger than other gaps of the plurality of azimuthal gaps.

19. The set of teeth of claim 14, wherein each respective tooth of the set of teeth comprises a respective slot pitch.

20. The set of teeth of claim 19, wherein the respective slot pitch of each respective tooth of the set of teeth is based on an axial location of the respective tooth.

21. The set of teeth of claim 19, wherein the respective slot pitch of each respective tooth of the set of teeth is based on a phase frequency of the winding hoop.

* * * * *